(12) United States Patent
Noda et al.

(10) Patent No.: US 11,491,672 B2
(45) Date of Patent: Nov. 8, 2022

(54) MICROFABRICATION DEVICE, MICROFABRICATION METHOD, TRANSFER MOLD, AND TRANSFER OBJECT

(71) Applicant: Dexerials Corporation, Shimotsuke (JP)

(72) Inventors: Kazuhiko Noda, Sendai (JP); Katsuhiro Doi, Sendai (JP); Asahiko Nogami, Sendai (JP); Kyoko Sakurai, Sendai (JP)

(73) Assignee: Dexerials Corporation, Shimotsuke (JP)

( * ) Notice: Subject to any disclaimer, the term of this patent is extended or adjusted under 35 U.S.C. 154(b) by 196 days.

(21) Appl. No.: 16/574,477

(22) Filed: Sep. 18, 2019

(65) Prior Publication Data

US 2020/0094430 A1 Mar. 26, 2020

(30) Foreign Application Priority Data

Sep. 21, 2018 (JP) .............................. JP2018-177767
Mar. 22, 2019 (JP) .............................. JP2019-055111

(51) Int. Cl.
*B23B 5/48* (2006.01)
*B26D 3/10* (2006.01)
*B23B 29/12* (2006.01)

(52) U.S. Cl.
CPC ................. *B26D 3/10* (2013.01); *B23B 5/48* (2013.01); *B23B 29/125* (2013.01)

(58) Field of Classification Search
CPC ............. B23B 5/48; B23B 29/125; B23B 5/08
See application file for complete search history.

(56) References Cited

U.S. PATENT DOCUMENTS

| 7,942,063 | B2 * | 5/2011 | Gao ........................ B24B 49/16 |
| | | | 73/760 |
| 8,503,082 | B2 * | 8/2013 | Ehnes .............. B29D 11/00798 |
| | | | 359/620 |
| 9,174,280 | B2 * | 11/2015 | Lee ....................... G02B 5/0278 |
| 2006/0230889 | A1 * | 10/2006 | Kimura .................... B23B 1/00 |
| | | | 82/1.11 |
| 2017/0297159 | A1 * | 10/2017 | Sannomiya ............. B23B 25/02 |

FOREIGN PATENT DOCUMENTS

| JP | 2004344916 A | 12/2004 |
| JP | 2008272925 A | 11/2008 |
| JP | 2015071303 A | 4/2015 |

* cited by examiner

*Primary Examiner* — Alan Snyder
(74) *Attorney, Agent, or Firm* — Kenja IP Law PC

(57) ABSTRACT

A new and improved microfabrication device, microfabrication method, transfer mold, and transfer object that can suppress a defect are provided. A microfabrication device comprises a tool mounting portion, a predetermined cutting tool, an oscillator, and a controller, wherein the controller performs a cutting process to satisfy at least one of: a cutting condition (1) that oscillations at a start point and an end point of each set are in phase with each other; and a cutting condition (2) that oscillations of the sets are in phase with each other.

7 Claims, 24 Drawing Sheets

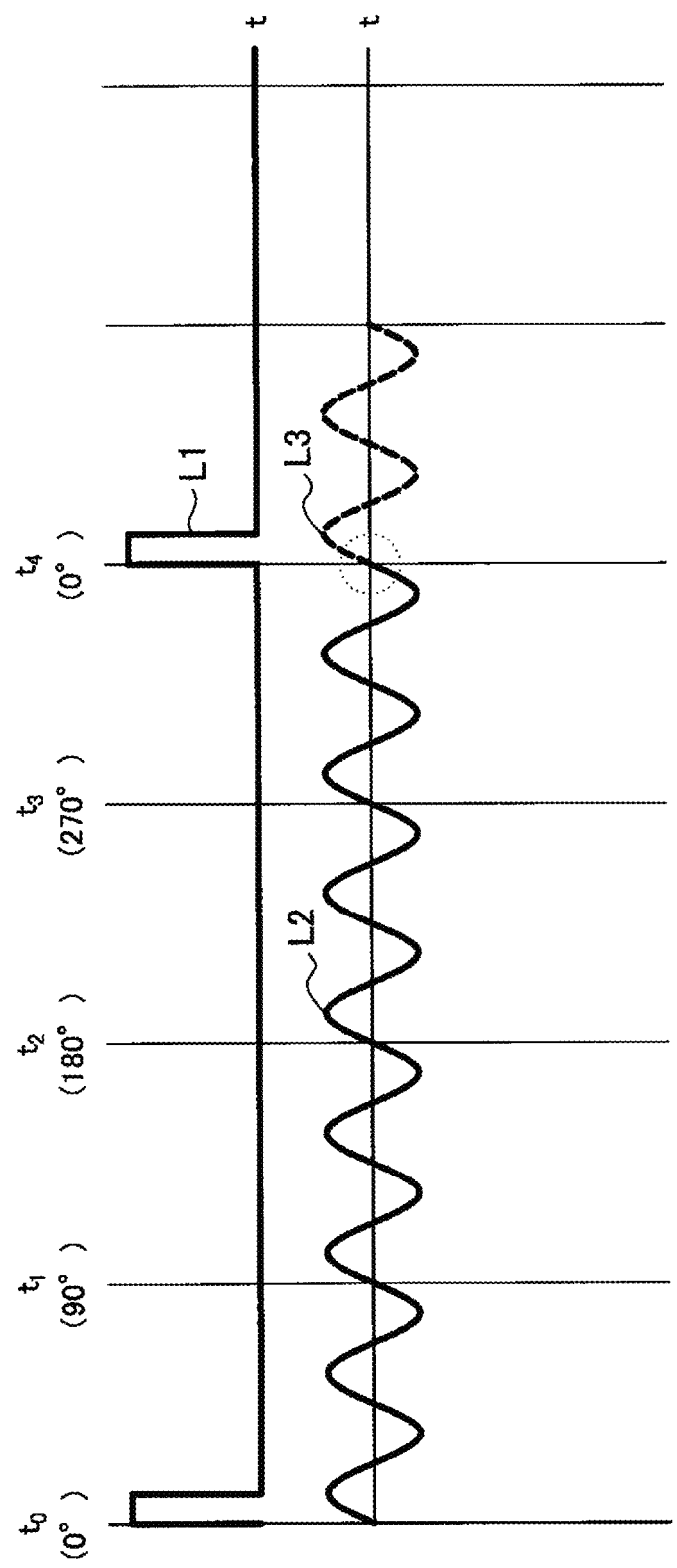

MICROFABRICATION DEVICE, MICROFABRICATION METHOD, TRANSFER MOLD, AND TRANSFER OBJECT

TECHNICAL FIELD

The present disclosure relates to a microfabrication device, a microfabrication method, a transfer mold, and a transfer object.

BACKGROUND

One of the microfabrication technologies is imprint technology by which a master having a fine concave-convex structure formed on its surface is pressed against a resin sheet or the like to transfer the fine concave-convex structure on the master to the resin sheet or the like.

A known master manufacturing method is a technique of forming a concave-convex structure on a surface of a master substrate by lithography and dry etching using laser light. With this technique, a concave-convex structure having an average period not greater than visible light wavelength can be formed on the surface of the master substrate. Thus, an ultrafine concave-convex structure can be produced by this technique. Meanwhile, the technique needs a highly accurate mask, which causes an increase in master manufacturing cost. Moreover, since a large-scale manufacturing line is necessary, not only initial cost but also maintenance cost is high.

Another known master manufacturing method is a technique of forming a concave-convex structure on a surface of a master substrate by cutting work using a cutting tool, as disclosed for example in PTL 1 to PTL 3. With this technique, a cutting tool having a tip (cutter) at its end is used to cut the master substrate, thus forming fine concave portions in a grid on the surface of the master substrate. The portions surrounded by the fine concave portions are fine convex portions. A fine concave-convex structure is thus formed on the surface of the master substrate. This technique has difficulty in forming such an ultrafine concave-convex structure formed by the foregoing technique, but has the advantage of being able to produce a master at relatively low cost. With the technique using the cutting tool, the cutting tool is moved relative to the master substrate to cut the master substrate.

With the technique using the cutting tool, the master substrate may be cut while oscillating the cutting tool, as disclosed for example in PTL 1. By such cutting, an oscillation waveform can be formed at the sidewall or the bottom of the fine concave portions. The cutting tool is oscillated for various purposes. For example, in the case of using the transfer object for optical applications, improvement in the optical properties of the transfer object can be expected.

CITATION LIST

Patent Literatures

PTL 1: JP 2015-71303 A
PTL 2: JP 2008-272925 A
PTL 3: JP 2004-344916 A

SUMMARY

Technical Problem

However, as a result of closely examining the technique of oscillating the cutting tool, we learned that a defect, i.e. breaking of the continuity of the oscillation waveform, occurs on the surface of the transfer object in some cases. Such a defect not only impairs the appearance of the transfer object, but also significantly decreases the optical properties of the transfer object in the case where the transfer object is used for optical applications.

It could be helpful to provide a new and improved microfabrication device, microfabrication method, transfer mold, and transfer object that can suppress a defect.

Solution to Problem

According to an aspect of the present disclosure, provided is a microfabrication device comprising: a tool mounting portion; a cutting tool provided in the tool mounting portion, and configured to form fine concave portions on a substrate; a driving portion configured to move the tool mounting portion relative to the substrate; an oscillator provided in the tool mounting portion, and configured to oscillate the cutting tool in at least one of a depth direction and a surface direction of the substrate; and a controller configured to perform a plurality of sets of a cutting process of cutting the substrate while moving the tool mounting portion relative to the substrate and oscillating the cutting tool, wherein the controller is configured to perform the cutting process to satisfy at least one of:

a cutting condition (1) that oscillations at a start point and an end point of each set are in phase with each other; and a cutting condition (2) that oscillations of the sets are in phase with each other.

The cutting process may include a deep cutting process of repeatedly cutting a same part, with a cutting depth of a current set being deeper than a cutting depth of a previous set.

The cutting process may include a parallel cutting process of performing cutting of a current set at a position adjacent to a cutting position of a previous set.

The substrate may have a columnar or cylindrical shape, the driving portion may include: a substrate driving portion configured to rotate the substrate about a central axis of the substrate as a rotation axis; and a tool movement portion configured to move the tool mounting portion in a direction parallel to the rotation axis, and the controller may be configured to move the tool mounting portion relative to the substrate, by rotating the substrate and moving the tool mounting portion in the direction parallel to the rotation axis.

According to another aspect of the present disclosure, provided is a microfabrication method using the above-described microfabrication device, the microfabrication method comprising: providing the cutting tool in the tool mounting portion; setting the tool mounting portion at a position facing the substrate; and performing a plurality of sets of a cutting process of cutting the substrate while moving the tool mounting portion relative to the substrate and oscillating the cutting tool, wherein the cutting process is performed to satisfy at least one of:

a cutting condition (1) that oscillations at a start point and an end point of each set are in phase with each other; and a cutting condition (2) that oscillations of the sets are in phase with each other.

According to another aspect of the present disclosure, provided is a transfer mold comprising a substrate having one or more fine concave portions formed on a surface thereof, wherein at least one of a sidewall and a bottom of each fine concave portion has an oscillation waveform satisfying at least one of:

an oscillation waveform condition (1) that the oscillation waveform is continuous;

an oscillation waveform condition (2) that the oscillation waveform is a composite waveform of a plurality of oscillation waveforms, and the plurality of oscillation waveforms are in phase with each other;

an oscillation waveform condition (3) that fine concave portions of a plurality of rows are formed on the substrate, and oscillation waveforms of adjacent fine concave portions are in phase with each other; and an oscillation waveform condition (4) that fine concave portions of a plurality of rows are formed on the substrate, and oscillation waveforms of the fine concave portions are in phase with each other for every two pitches.

The substrate may have a columnar or cylindrical shape.

According to another aspect of the present disclosure, provided is a transfer object comprising a substrate having one or more fine concave portions formed on a surface thereof, wherein at least one of a sidewall and a bottom of each fine concave portion has an oscillation waveform satisfying at least one of:

an oscillation waveform condition (1) that the oscillation waveform is continuous;

an oscillation waveform condition (2) that the oscillation waveform is a composite waveform of a plurality of oscillation waveforms, and the plurality of oscillation waveforms are in phase with each other;

an oscillation waveform condition (3) that fine concave portions of a plurality of rows are formed on the substrate, and oscillation waveforms of adjacent fine concave portions are in phase with each other; and an oscillation waveform condition (4) that fine concave portions of a plurality of rows are formed on the substrate, and oscillation waveforms of the fine concave portions are in phase with each other for every two pitches.

Advantageous Effect

It is thus possible to suppress a defect by performing cutting that satisfies at least one of the cutting conditions (1) and (2).

BRIEF DESCRIPTION OF THE DRAWINGS

In the accompanying drawings:

FIG. 5 is a timing chart illustrating the relationship between the rotation angle of a master substrate and the oscillation waveform of a cutting tool;

DETAILED DESCRIPTION

Disclosed embodiments will be described in detail below, with reference to the attached drawings. In the description and the drawings, components having substantially the same functional structures are given the same reference signs, and repeated description is omitted.

<1. Structure of Microfabrication Device>

Figure 1A:
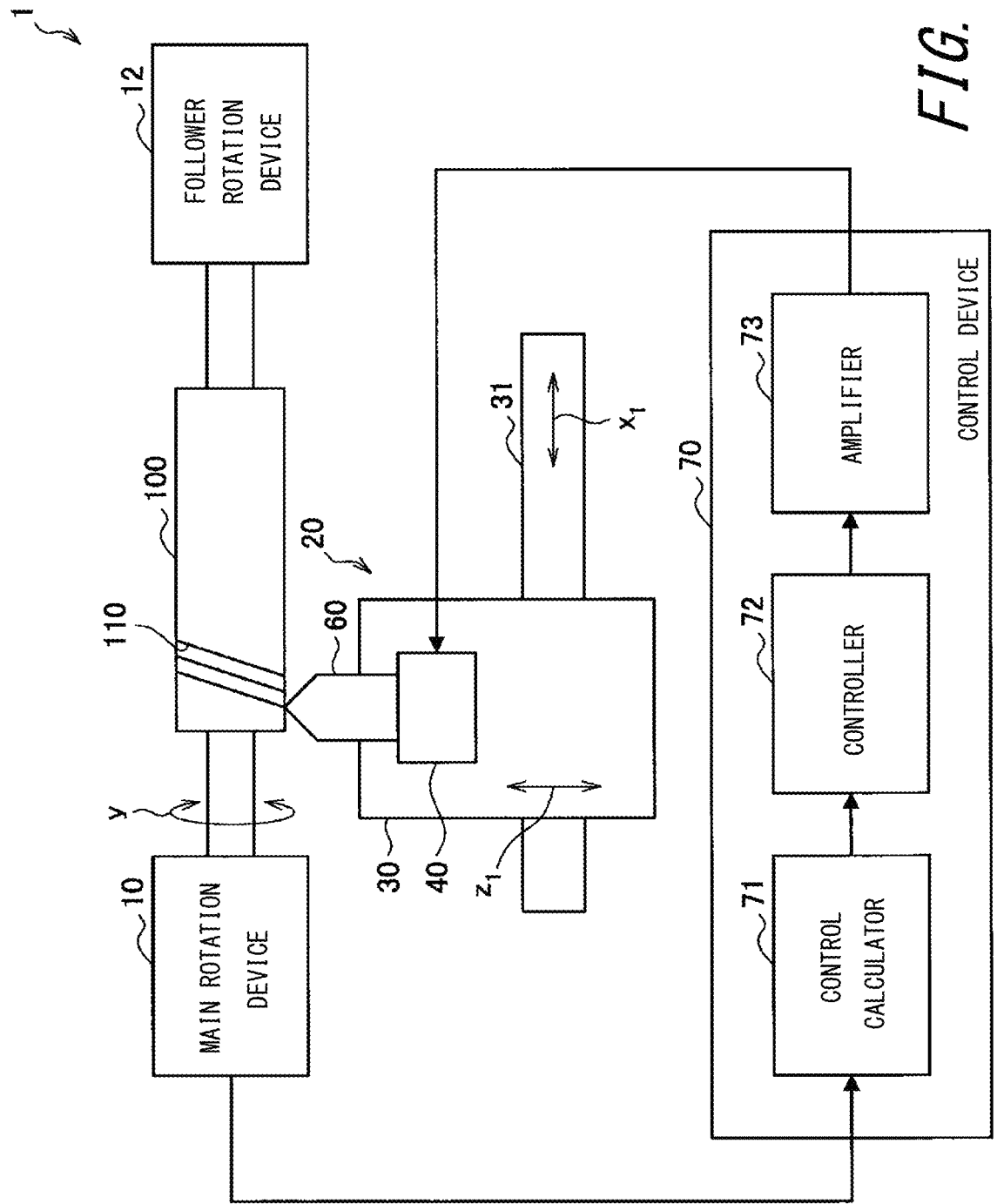
FIG. 1A is a block diagram illustrating the overall structure of a microfabrication device 1 according to one of the disclosed embodiments.
Figure 10A:
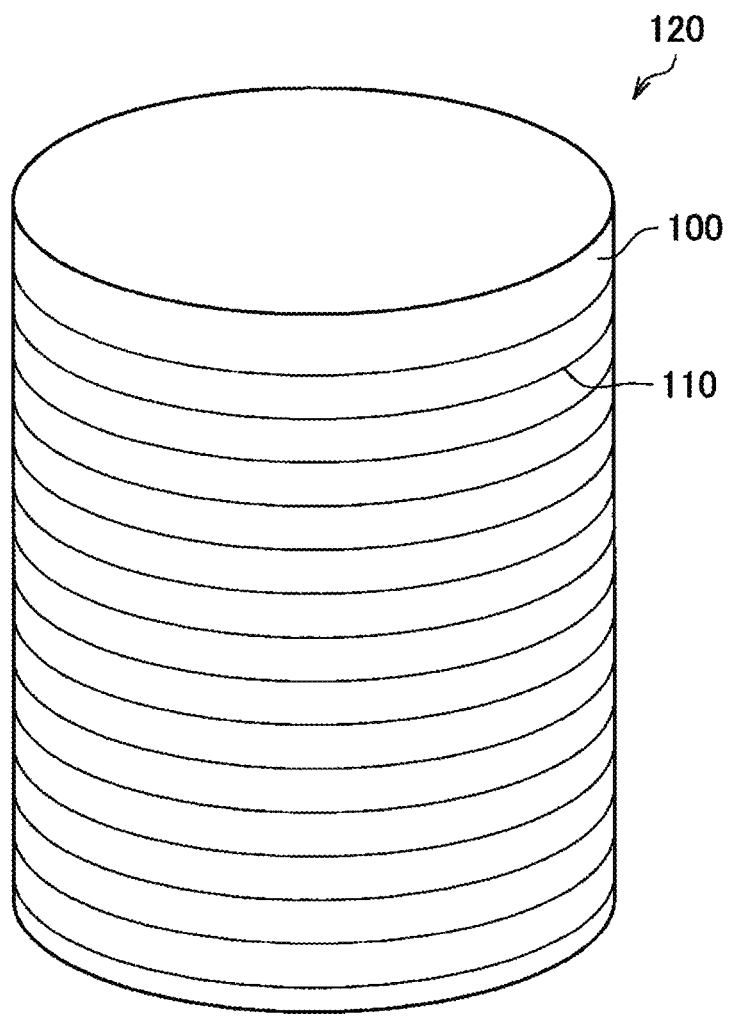
FIG. 10A is a perspective view illustrating an example of a master (transfer mold)
Figure 10B:
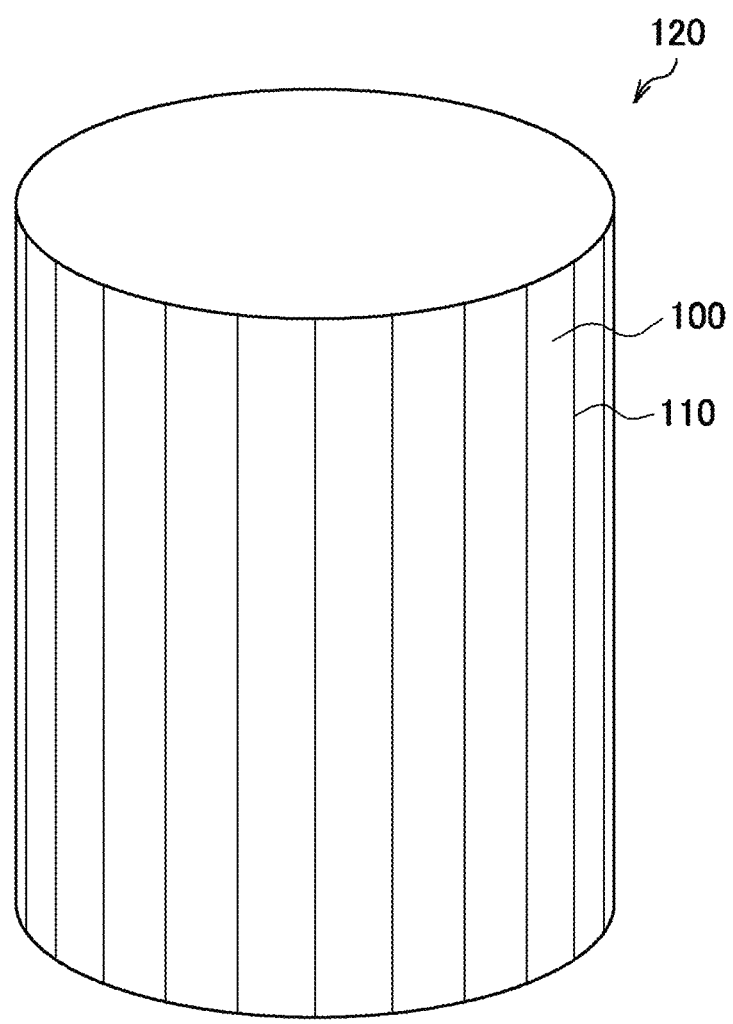
FIG. 10B is a perspective view illustrating an example of a master (transfer mold)
Figure 10C:
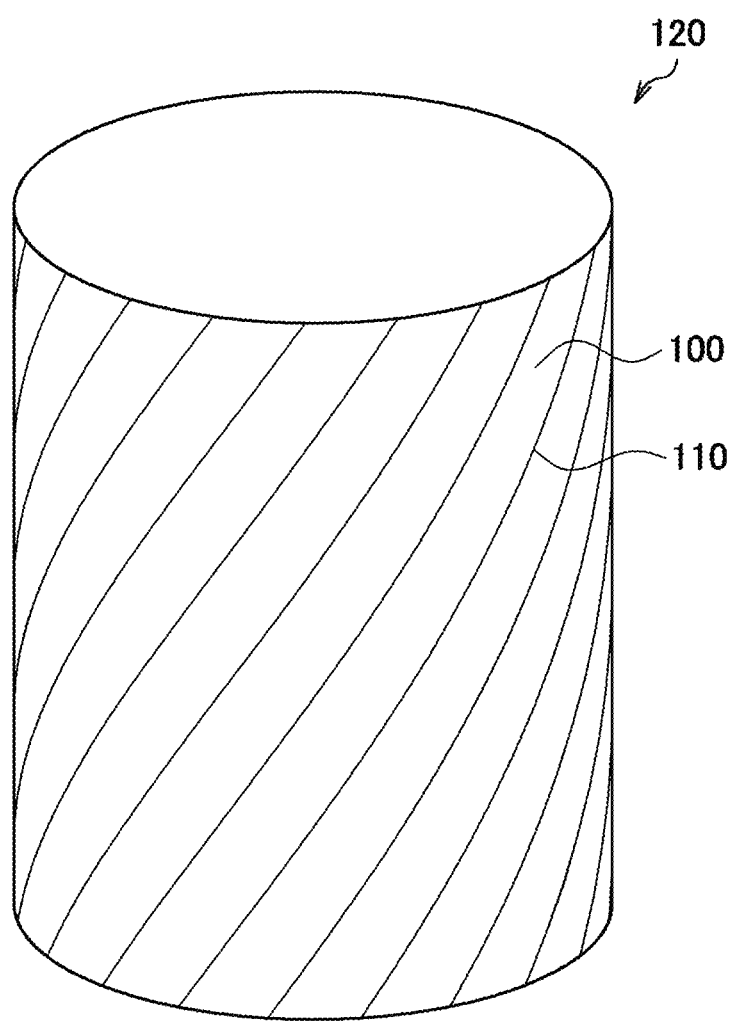
FIG. 10C is a perspective view illustrating an example of a master (transfer mold)

The structure of a microfabrication device 1 according to an embodiment will be described below, with reference to FIGS. 1A and 2. FIG. 1A is a block diagram illustrating the overall structure of the microfabrication device 1 that performs cutting while synchronizing the oscillation of a cutting tool and the rotation of a master substrate (roll). The microfabrication device 1 cuts a master substrate (roll) 100 to form fine concave portions 110 on the surface of the master substrate 100. A master 120 illustrated in any of FIGS. 10A to 10C is thus produced. The master substrate 100 has a columnar or cylindrical shape. The master 120 is, for example, a master for imprinting, and can be used as a transfer mold to produce a transfer object 200 illustrated in FIGS. 11A and 11B. The master 120 and the transfer object 200 will be described later. The structure in FIG. 1A can be used, for example, in the case of forming the below-described round slice cutting pattern or helical cutting pattern.

The microfabrication device 1 includes a main rotation device 10 (substrate driving portion), a follower rotation device 12, a cutting device 20, and a control device 70.

The main rotation device 10, the central axis of the master substrate 100, and the follower rotation device 12 are coaxially arranged. The main rotation device 10 in FIG. 1A includes an encoder (not illustrated), and transmits rotation information about the rotation angle of the main rotation device 10 from the encoder to the control device 70. For example, the rotation information is a pulse signal. Each time the main rotation device 10 rotates a predetermined angle, the main rotation device 10 transmits the rotation information to the control device 70. The predetermined angle is set based on the resolution of the encoder. For example, in the case where the resolution of the encoder is 1440000 pulses, the predetermined angle may be 360/1440000°. In this embodiment, the rotation direction of the main rotation device 10 (i.e. the circumferential direction of the master substrate 100) is y-axis, and the forward direction of the y-axis is counterclockwise as seen from the follower rotation device 12. The rotation speed (number of rotations) of the master substrate 100 by the main rotation device 10 is not limited, and may be, for example, 1 min$^{-1}$ to 100 min$^{-1}$.

The cutting device 20 includes a processing stage 30 (tool movement portion), a feed shaft 31, a tool mounting portion 40, an oscillator 50, and a cutting tool 60. The tool mounting portion 40 is mounted on the processing stage 30. The processing stage 30 is movable along the feed shaft 31. The feed shaft 31 extends in a direction parallel to the rotation axis of the main rotation device 10 (i.e. the length direction of the master substrate 100) (that is, extends in the surface direction of the substrate, i.e. the direction parallel to the substrate surface). In this embodiment, the extending direction of the feed shaft 31 is $x_1$-axis, and the right direction in FIG. 1 is the forward direction of the $x_1$-axis. The processing stage 30 is also movable in a cutting axis (shaft) direction (the depth direction of the substrate). In this embodiment, the cutting axis is $z_1$-axis, and the up direction in FIG. 1 (the direction approaching the master substrate 100) is the forward direction of the $z_1$-axis. Hence, the processing stage 30 can move the tool mounting portion 40 (more specifically, the cutting tool 60 mounted in the tool mounting portion 40) in the $x_1$-axis direction or the $z_1$-axis direction. Thus, in this embodiment, the main rotation device 10 rotates the master substrate 100 in the y-axis direction, and the processing stage 30 moves the tool mounting portion 40 in the $x_1$-axis or $z_1$-axis direction. The tool mounting portion 40 accordingly moves relative to the master substrate 100. The main rotation device 10 and the processing stage 30 thus function as a driving portion that moves the tool mounting portion 40 relative to the master substrate 100.

The tool mounting portion 40 is mounted on the processing stage 30, and moves in the $x_1$-axis direction or the $z_1$-axis direction together with the processing stage 30. The position of the tool mounting portion 40 is measured as a coordinate value on an $x_1z_1$ plane. The measurement is performed by a displacement measuring instrument (not illustrated). The displacement measuring instrument outputs $x_1z_1$ coordinate information about the measured $x_1z_1$ coordinate value of the tool mounting portion 40 to the control device 70. The tool mounting portion 40 has a case storage recess 41, and the oscillator 50 and the cutting tool 60 are stored in the case storage recess 41.

The oscillator 50 oscillates the cutting tool 60 in $x_2$-axis direction or $z_2$-axis direction. Thus, in this embodiment, a processing axis ($x_2z_2$-axis) different from the processing axis ($x_1z_1$-axis) by the processing stage 30 is created, and these axes are controlled independently. Specifically, the oscillator 50 includes a tool storage case 51, tool oscillation elements 52a and 53a, and displacement measuring instruments 52b and 53b.

The tool storage case 51 stores the cutting tool 60. The tool storage case 51 is mounted in the case storage recess 41 formed in the tool mounting portion 40. The tool oscillation element 52a connects the base end (bottom surface) of the cutting tool 60 and the bottom surface of the tool storage case 51. The tool oscillation element 52a oscillates the cutting tool 60 in the $z_2$-axis direction. The $z_2$-axis is an axis parallel to the $z_1$-axis, and the forward direction of the $z_2$-axis is the same as the forward direction of the $z_1$-axis. The type of the tool oscillation element 52a is not limited. The tool oscillation element 52a may be any device capable of moving the cutting tool 60 in the $z_2$-axis direction, but is preferably a linear motion stage of high accuracy and high rigidity. Preferable examples of the tool oscillation element 52a include a piezoelectric element, a linear motor, and an ultrasonic element. Particularly preferable examples of the tool oscillation element 52a include a piezoelectric element. The oscillation of the tool oscillation element 52a is controlled by the control device 70.

The displacement measuring instrument 52b measures the displacement of the oscillation of the cutting tool 60 in the $z_2$-axis direction, as a $z_2$ coordinate value. The displacement measuring instrument 52b may be any device capable of measuring the displacement of the oscillation of the cutting tool 60 in the $z_2$-axis direction, but is preferably a device of high accuracy and small size with little hysteresis. Preferable examples of the displacement measuring instrument 52b include measuring instruments of capacitance type, laser interference type, and pressure-sensitive dial indicator type. The displacement measuring instrument 52b outputs $z_2$ coordinate information about the measured $z_2$ coordinate value to the control device 70.

The tool oscillation element 53a extends in the $x_2$-axis direction, and connects the outer wall surface of the tool storage case 51 and the outer wall surface of the case storage recess 41. The tool oscillation element 53a moves the cutting tool 60 in the $x_2$-axis direction. The $x_2$-axis is an axis parallel to the $x_1$-axis, and the forward direction of the $x_2$-axis is the same as the forward direction of the $x_1$-axis. Preferable examples of the tool oscillation element 53a include a piezoelectric element, a linear motor, and an ultrasonic element. Particularly preferable examples of the tool oscillation element 53a include a piezoelectric element. The oscillation of the tool oscillation element 53a is controlled by the control device 70.

The displacement measuring instrument 53b measures the displacement of the oscillation of the cutting tool 60 in the $x_2$-axis direction, as an $x_2$ coordinate value. The displacement measuring instrument 53b may be any device capable of measuring the displacement of the cutting tool 60 in the $x_2$-axis direction, but is preferably a device of high accuracy and small size with little hysteresis. Preferable examples of the displacement measuring instrument 53b include measuring instruments of capacitance type, laser interference type, and pressure-sensitive dial indicator type. The displacement measuring instrument 53b outputs $x_2$ coordinate information about the measured $x_2$ coordinate value to the control device 70. In this embodiment, the $x_2z_2$ coordinate value of the cutting tool 60 is the $x_2z_2$ coordinate value of the below-described tool tip 63.

The cutting tool 60 is movably provided in the tool mounting portion 40. The cutting tool 60 includes a tool body 61 and a tool cutter (tip) 62. The tool body 61 is a rodlike member extending in the $z_2$-axis direction. The bottom surface of the cutting tool 60 is preferably smooth, because the above-described tool oscillation element 52a and the like are mounted on the bottom surface. The tool cutter 62 is attached to the end of the tool body 61. The tool cutter 62 has a taper shape. The tool tip 63 (point of action) at the tip of the tool cutter 62 is pressed against the master substrate 100 to cut the master substrate 100. The shape of the tool tip 63 is not limited, and may be, for example, a rectangle or a curved surface. Thus, a fine concave portion 110 is formed on the surface of the master substrate 100. The shape of the bottom 110a of the fine concave portion 110 reflects the shape of the tool tip 63. The material of the tool cutter 62 may be, for example, diamond, cemented carbide, high-speed tool steel, or cubic boron nitride (CBN). The tool cutter 62 is produced by polishing such material. The tool cutter 62 may be produced by laser radiation, ion milling, or the like.

Figure 2:
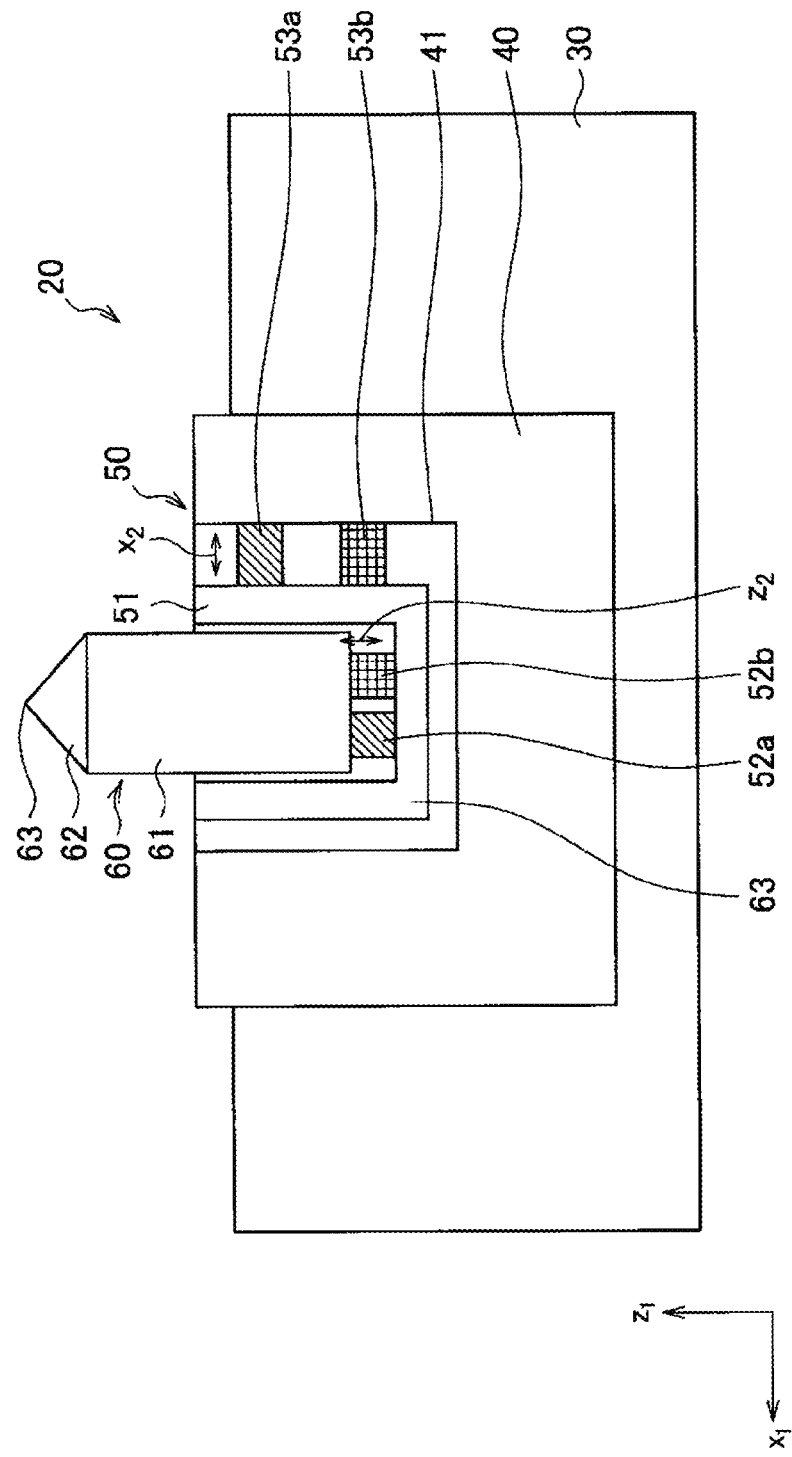
FIG. 2 is a sectional view illustrating the detailed structure of a cutting device according to one of the disclosed embodiments.
Figure 3:
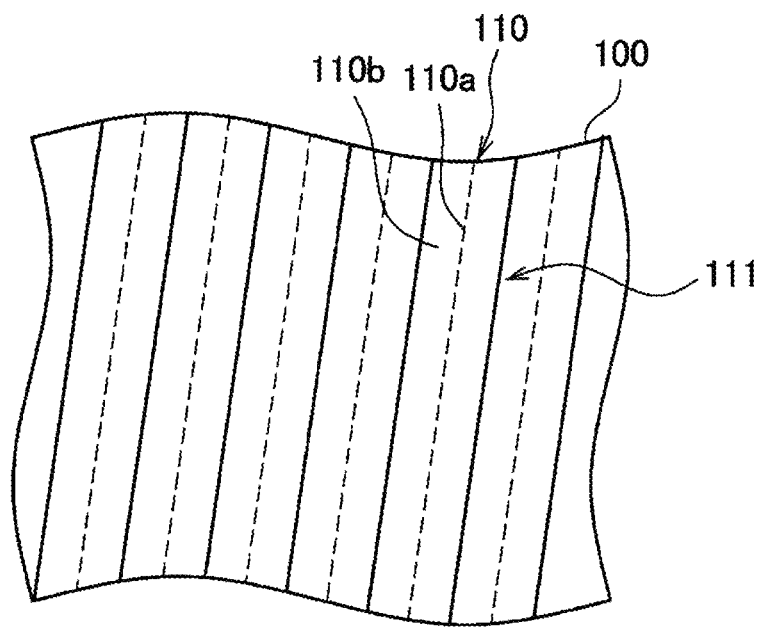
FIG. 3 is a side view illustrating a helical cutting pattern which is an example of a cutting pattern.
Figure 4A:
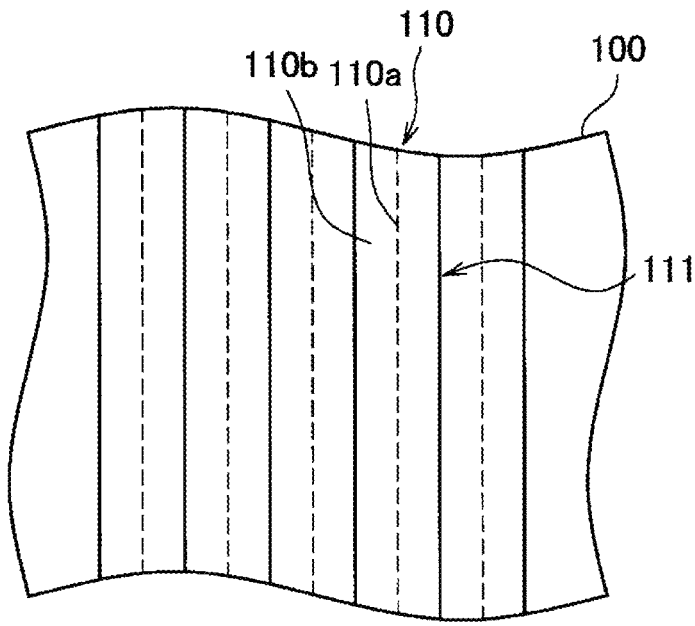
FIG. 4A is a side view illustrating a round slice cutting pattern which is an example of a cutting pattern.
Figure 4B:
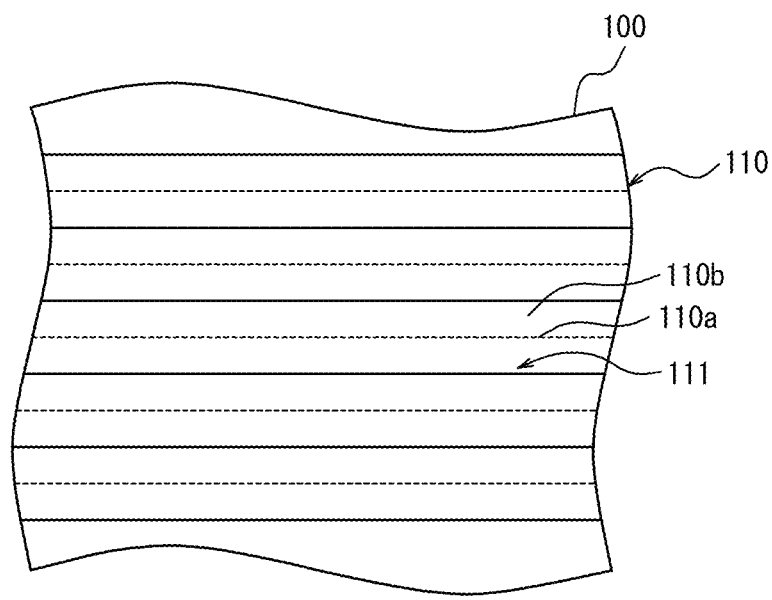
FIG. 4B is a side view illustrating a thrust cutting pattern which is an example of a cutting pattern.
Figure 4C:
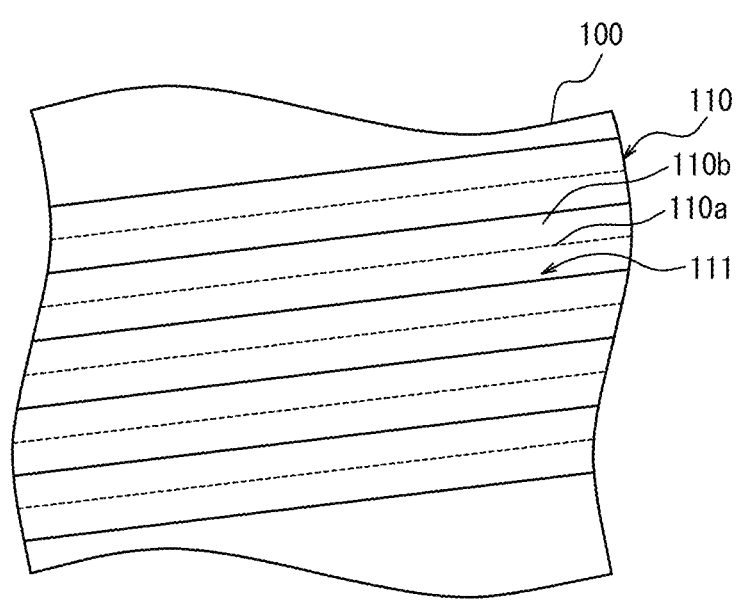
FIG. 4C is a side view illustrating an oblique thrust cutting pattern which is an example of a cutting pattern.

FIG. 2, etc. schematically illustrate the cutting tool 60, and the shape of the cutting tool 60 is not limited to that illustrated in FIG. 2, etc. For example, the tool body 61 and the tool cutter 62 may be formed integrally. Although one set of the tool mounting portion 40, the oscillator 50, and the cutting tool 60 is formed on the processing stage 30 in the example in FIG. 2, a plurality of sets of these members may be formed on the processing stage 30.

The control device 70 in FIG. 1A is connected to the main rotation device 10 and the cutting device 20 by communication cables or the like, and can communicate information (e.g. the rotation information of the main rotation device 10, the $x_1z_1$ coordinate information of the tool mounting portion 40, the $x_2z_2$ coordinate information of the cutting tool 60) with these devices.

Specifically, the control device 70 includes a control calculator 71, a controller 72, and an amplifier 73. The control device 70 includes, as a hardware structure, a CPU (central processing unit, i.e. processor), RAM (random access memory), ROM (read only memory), a hard disk, various input operation devices (keyboard, mouse, etc.), a display, an arbitrary waveform generator, a communication device, and the like. The ROM stores information necessary for the process by the control device 70, such as a processing program. The CPU reads the processing program stored in the ROM, and executes it. The arbitrary waveform generator is a device for generating an arbitrary waveform with an arbitrary frequency and voltage, and is used to output the $x_2z_2$ coordinate value of the cutting tool 60 described later.

The control calculator 71 in FIG. 1A calculates the $x_1z_1$ coordinate value of the tool mounting portion 40 and the $x_2z_2$ coordinate value of the cutting tool 60 (roughly, the oscillation waveform in the $x_2$-axis direction or the $z_2$-axis direction), based on the information provided from the main rotation device 10. The control calculator 71 outputs coordinate information about the calculated coordinate value to the controller 72.

The controller 72 controls the operation of the cutting device 20 based on the coordinate information provided from the control calculator 71. Specifically, the controller 72 generates oscillation control information for moving the cutting tool 60 to the $x_2z_2$ coordinate value calculated by the control calculator 71, and outputs the oscillation control information to the amplifier 73. The amplifier 73 amplifies the oscillation control information, and outputs the amplified oscillation control information to the oscillator 50. The tool oscillation elements 52a and 53a in the oscillator 50 operate based on the oscillation control information. The cutting tool 60 is thus oscillated. Moreover, the controller 72 controls the processing stage 30 based on the coordinate information, to move the tool mounting portion 40 in the $x_1$-axis direction or the $z_1$-axis direction. Consequently, fine concave portions 110 are formed on the master substrate 100 in a desired cutting pattern. The control by the controller 72 will be described in detail later.

Figure 1B:
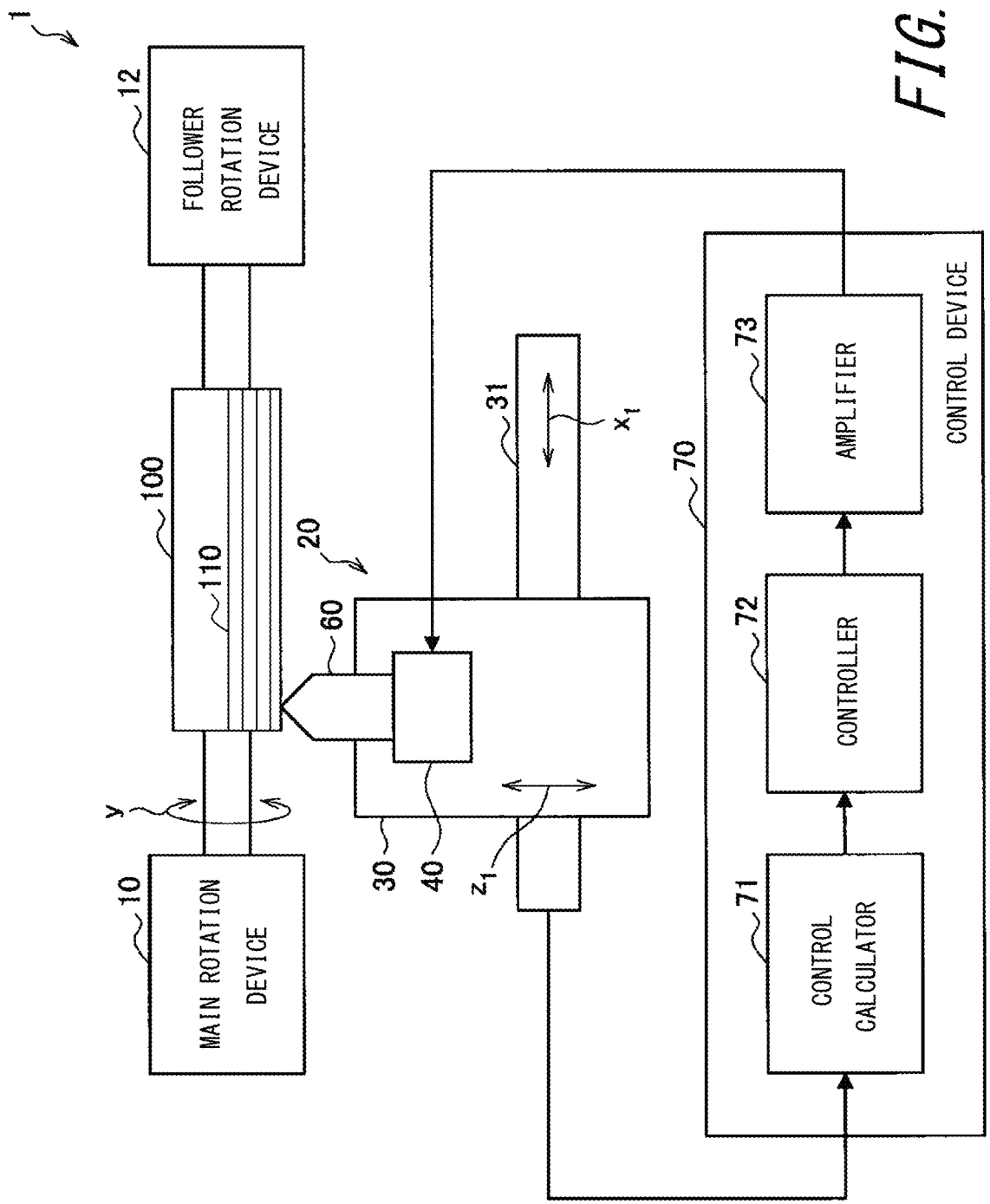
FIG. 1B is a block diagram illustrating the overall structure of a microfabrication device 1 according to another one of the disclosed embodiments.

FIG. 1B is a block diagram illustrating the overall structure of the microfabrication device 1 that performs cutting while synchronizing the oscillation of the cutting tool and the coordinate of the feed shaft of the cutting tool. The overall structure in FIG. 1B is approximately the same as that in FIG. 1A, except that the synchronization method for the oscillation of the cutting tool is different. The structure in FIG. 1B can be used, for example, in the case of forming the below-described thrust cutting pattern or oblique thrust cutting pattern. The differences from FIG. 1A will be mainly described below.

The feed shaft 31 in FIG. 1B includes a scale (not illustrated), and transmits position information about the coordinate of the feed shaft 31 from the scale to the control device 70. For example, the position information is a pulse signal. Each time the feed shaft 31 moves a predetermined distance, the position information can be transmitted to the control device 70. The feed speed (movement speed) of the feed shaft 31 is not limited. The feed speed may be 1,000 mm/min to 20,000 mm/min, and is desirably 10,000 mm/min.

The control device 70 in FIG. 1B is connected to the feed shaft 31 and the cutting device 20 by communication cables or the like, and can communicate information (e.g. the position information of the feed shaft 31, the $x_1z_1$ coordinate information of the tool mounting portion 40, the $x_2z_2$ coordinate information of the cutting tool 60) with these devices.

The control calculator 71 in FIG. 1B calculates the $z_1$ coordinate value of the tool mounting portion 40 and the $x_2z_2$ coordinate value of the cutting tool 60 (roughly, the oscillation waveform in the $x_2$-axis direction or the $z_2$-axis direction), based on the information provided from the feed shaft 31. The control calculator 71 outputs coordinate information about the calculated coordinate value to the controller 72.

The controller 72 controls the operation of the cutting device 20 based on the coordinate information provided from the control calculator 71. Specifically, the controller 72 generates oscillation control information for moving the cutting tool 60 to the $x_2z_2$ coordinate value calculated by the control calculator 71, and outputs the oscillation control information to the amplifier 73. The amplifier 73 amplifies the oscillation control information, and outputs the amplified oscillation control information to the oscillator 50. The tool oscillation elements 52a and 53a in the oscillator 50 operates based on the oscillation control information. The cutting tool 60 is thus oscillated. Moreover, the controller 72 controls the processing stage 30 based on the coordinate information, to move the tool mounting portion 40 in the $z_1$-axis direction. Consequently, fine concave portions 110 are formed on the master substrate 100 in a desired cutting pattern. The control by the controller 72 will be described in detail later.

<2. Overview of Process by Controller>

An overview of the process by the controller 72 will be described below, with reference to FIGS. 3, 4A, 4B, and 4C. The controller 72 controls the operation of the cutting device 20, as described above. More specifically, the controller 72 performs a plurality of sets of a cutting process. The cutting process is a process of cutting the master substrate 100 while moving the tool mounting portion 40 relative to the master substrate 100 and oscillating the cutting tool 60. By moving the tool mounting portion 40 relative to the master substrate 100, the fine concave portions 110 are formed on the master substrate 100, thus achieving a helical cutting pattern illustrated in FIG. 3, a round slice cutting pattern illustrated in FIG. 4A, a thrust cutting pattern illustrated in FIG. 4B, or an oblique thrust cutting pattern illustrated in FIG. 4C. The helical cutting pattern, the round slice cutting pattern, the thrust cutting pattern, and the oblique thrust cutting pattern are each an example of a parallel cutting process of performing the cutting of the current set at a position adjacent to the cutting position of the previous set. Each fine concave portion 110 has a bottom 110a and a sidewall 110b. The boundary part between adjacent fine concave portions 110 is a fine convex portion 111.

The helical cutting pattern is a pattern in which the fine concave portions 110 are helically formed on the master substrate 100. The helical cutting pattern is produced roughly by the following process. While rotating the master substrate 100, the tool mounting portion 40 is moved in the $x_1$-axis direction relatively slowly. The helical cutting pattern is thus formed on the master substrate 100. In the case of forming the helical cutting pattern on the master substrate 100, cutting for one or more rounds of the master substrate 100 is one set of the cutting process. By performing a plurality of sets of the cutting process, the controller 72 forms the fine concave portions 110 in helical shape from one end to the other end of the master substrate 100. After forming the helical cutting pattern on the master substrate 100, the helical cutting pattern may be formed again with the helical inclination direction being inverted. This pattern is also referred to as a cross helical cutting pattern.

The round slice cutting pattern is a pattern in which the fine concave portions 110 are formed along the circumferential direction of the master substrate 100. The extending direction of the fine concave portions 110 is perpendicular to the axis direction of the master substrate 100. The round slice cutting pattern is produced roughly by the following process. Having fixed the $x_1$ coordinate of the tool mounting portion 40, the master substrate 100 is rotated. The fine concave portion 110 is thus formed on the master substrate 100. After the fine concave portion 110 is formed on the master substrate 100 for one round, the tool mounting portion 40 is moved in the $x_1$ direction by one pitch, and the same process is repeated. Herein, the term "pitch" denotes the distance between adjacent fine concave portions 110, that is, the distance between the center lines of the fine concave portions 110 in the width direction. The round slice cutting pattern is thus formed on the master substrate 100. In the case of forming the round slice cutting pattern on the master substrate 100, cutting for one or more rounds of the master substrate 100 is one set of the cutting process. By performing a plurality of sets of the cutting process, the controller 72 forms the fine concave portions 110 in round slice shape from one end to the other end of the master substrate 100.

The thrust cutting pattern is a pattern in which the fine concave portions 110 are formed along the axis direction of the master substrate 100. The extending direction of the fine concave portions 110 is parallel to the axis direction of the master substrate 100. The thrust cutting pattern is produced roughly by the following process. Without rotating the master substrate 100, the tool mounting portion 40 is moved in the $x_1$-axis direction. The fine concave portion 110 is thus formed on the master substrate 100. After the fine concave portion 110 is formed for one row from one end to the other end of the master substrate 100, the tool mounting portion 40 is moved to the start position, and the master substrate 100 is rotated by one pitch in the forward direction or backward direction of the y-axis and stopped. The same process is then repeated. Herein, the term "pitch" denotes the distance between adjacent fine concave portions 110, that is, the distance between the center lines of the fine concave portions 110 in the width direction. The thrust cutting pattern is thus formed on the master substrate 100. In the case of forming the thrust cutting pattern on the master substrate 100, cutting for one or more rows of the master substrate 100 is one set of the cutting process. By performing a plurality of sets of the cutting process, the controller 72 forms the fine concave portions 110 of a plurality of rows parallel to the axis direction of the master substrate 100 on the circumferential surface of the master substrate 100.

The oblique thrust cutting pattern is a pattern in which the fine concave portions 110 are formed at an inclination with respect to the axis direction of the master substrate 100. The oblique thrust cutting pattern is produced roughly by the following process. While rotating the master substrate 100 relatively slowly, the tool mounting portion 40 is moved in the $x_1$-axis direction. The fine concave portion 110 is thus formed on the master substrate 100. After the fine concave portion 110 is formed for one row from one end to the other end of the master substrate 100 (or after the fine concave portion 110 is formed for one or more rounds on the master substrate 100), the tool mounting portion 40 is moved to the start position, and the start rotation angle (y coordinate) of the master substrate 100 is shifted by one pitch in the forward direction or backward direction of the y-axis and stopped. The same process is then repeated. The oblique thrust cutting pattern is thus formed on the master substrate 100. In the case of forming the oblique thrust cutting pattern on the master substrate 100, cutting for one or more rows of the master substrate 100 (or cutting for one or more rounds of the master substrate 100) is one set of the cutting process. By performing a plurality of sets of the cutting process, the controller 72 forms the fine concave portions 110 of a plurality of rows at an inclination with respect to the axis direction of the master substrate 100 on the circumferential surface of the master substrate 100.

The inclination angle of the fine concave portions 110 in the helical cutting pattern with respect to the direction perpendicular to the axis direction of the master substrate 100 is typically more than 0° and less than 1°. The inclination angle of the fine concave portions 110 in the oblique thrust cutting pattern with respect to the direction perpendicular to the axis direction of the master substrate 100 is typically 1° or more and less than 180° (i.e. the inclination angle with respect to the axis direction of the master substrate 100 is typically more than 0° and 179° or less). These inclination angle ranges are, however, not a limitation, as a helical cutting pattern or an oblique thrust cutting pattern is selected based on the load of the cutting tool, the cutting time, and the like. For example, in this embodiment, a helical cutting pattern whose inclination angle with respect to the direction perpendicular to the axis direction of the master substrate 100 is more than 1° may be selected.

The controller 72 may perform a deep cutting process of repeatedly cutting the same part, in each cutting pattern. In the case of performing the deep cutting process, any of the foregoing cutting patterns is repeatedly formed with different cutting depths. Cutting at each cutting depth is therefore one set of the deep cutting process. The controller 72 sets the cutting depth of the current set to be deeper than the cutting depth of the previous set.

The controller 72 performs cutting while oscillating the cutting tool 60, in each cutting pattern. Consequently, at least one of the bottom 110*a* and the sidewall 110*b* of the fine concave portion 110 has an oscillation waveform.

Moreover, the controller 72 performs the cutting process so as to satisfy at least one of the following cutting conditions (1) and (2). Preferably, the controller 72 performs cutting so as to satisfy both of the cutting conditions (1) and (2). Herein, "the oscillations of the sets are in phase with each other" in the cutting condition (2) means that the phase at the same rotation angle (y coordinate) of the master substrate 100 is the same among the sets.

Cutting condition (1): the oscillations at the start point and the end point of each set are in phase with each other.

Cutting condition (2): the oscillations of the sets are in phase with each other.

As an example, the cutting conditions (1) and (2) in the case of using the structure in FIG. 1A will be described below, with reference to FIG. 5. In FIG. 5, the horizontal axis represents time. The upper graph L1 represents the output timing of the rotation information of the master substrate 100. The rotation angle of the master substrate 100 at times $t_0$, $t_1$, $t_2$, $t_3$, and $t_4$ is respectively 0°, 90°, 180°, 270°, and 360° (=0°). The output timing of rotation information indicating that the rotation angle of the master substrate 100 is 0° (=360°) is illustrated here, to facilitate understanding. The lower graphs L2 and L3 represent the oscillation waveform of the cutting tool 60 (i.e. the $z_2$ coordinate value of the cutting tool 60 at each time). In the example in FIG. 5, cutting for one turn of the master substrate 100 is one set. That is, the graph L2 represents the oscillation waveform of the current set, and the graph L3 represents the oscillation waveform of the next set.

As illustrated in FIG. 5, the oscillations at the start point and the end point of each set are in phase with each other (0° at both points). The cutting condition (1) is thus satisfied. Moreover, the oscillations of the sets are in phase with each other. For example, the phase at the start point of each set is 0°, and thus the sets are in phase with each other at the same rotation angle (y coordinate value). The cutting condition (2) is thus satisfied.

The controller 72 performs cutting while synchronizing the oscillation of the cutting tool 60 and the rotation of the master substrate 100 in this way. As a result, oscillation continuity is maintained among the sets without a defect. For example, in each of the foregoing cutting patterns, the oscillation waveforms are in phase with each other for every one or more sets. That is, the oscillation waveforms of adjacent fine concave portions 110 may be in phase with each other. In the helical cutting pattern (and the oblique thrust cutting pattern), in addition to the above, the oscillation waveforms of the fine concave portions 110 are in phase with each other at the connection part between the sets. In the round slice cutting pattern, in addition to the above, the oscillation waveforms of the fine concave portions 110 are in phase with each other at the connection part of the start point and the end point of the set. In the thrust cutting pattern (and the oblique thrust cutting pattern), in addition to the above, the oscillation waveforms of the fine concave portions 110 are in phase with each other at the start point and the end point of the set. Further, in the case of performing the deep cutting process, the oscillations of the deep cutting sets are in phase with each other, so that the oscillation waveform of the fine concave portion 110 accurately reflects the oscillation waveform of the cutting tool 60 in each set. To enable the controller 72 to perform the above-described process, the control calculator 71 calculates the $x_1 z_1$ coordinate value of the tool mounting portion 40, the $x_2 z_2$ coordinate value of the cutting tool 60, and the like. The oscillation waveform is not limited. For example, the oscillation waveform is a sine waveform. The oscillation waveform is, however, not limited to this, and may be any oscillation waveform. For example, the oscillation waveform may be a trapezoidal waveform. In this embodiment, the term "defect" denotes a part at which the continuity of the oscillation waveform breaks (a part where the shape is disturbed, such as a difference in level), which is observable with the naked eye or some kind of microscope (e.g. a scanning electron microscope or a microscope).

Furthermore, in this embodiment, the processing axis ($x_2 z_2$-axis) different from the processing axis ($x_1 z_1$-axis) by the processing stage 30 is created, and these axes are controlled independently to control the position of the cutting tool 60. Therefore, point group data is unnecessary. The point group data is the three-dimensional position data of the cutting tool 60. For example, the cutting tool 60 can be moved by attaching the cutting tool 60 to an NC machine and controlling the NC machine according to point group data. However, microfabrication is difficult in such a case. Suppose, for example, the pitch of the helical cutting pattern is 0.01 mm, and the number of pieces of point group data is 10000 per one pitch. In this case, an instruction (an instruction to move the cutting tool 60) needs to be issued per 0.01/10000 mm in the $x_1$-axis direction (feed direction) of the cutting tool 60. Conventional NC machines cannot operate at such a resolution. Accordingly, the number of pieces of point group data per one pitch needs to be reduced, which causes a decrease in processing accuracy. In this embodiment, point group data is unnecessary, and microfabrication is possible.

<3. Specific Examples of Process by Controller>

Figure 6A:
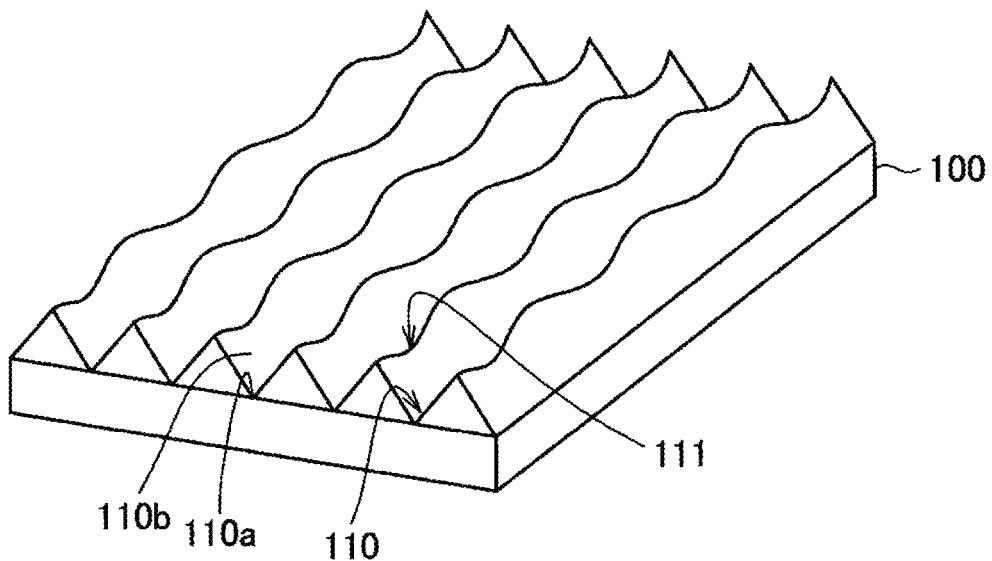
FIG. 6A is a perspective view illustrating a specific example of fine concave portions.
Figure 6B:
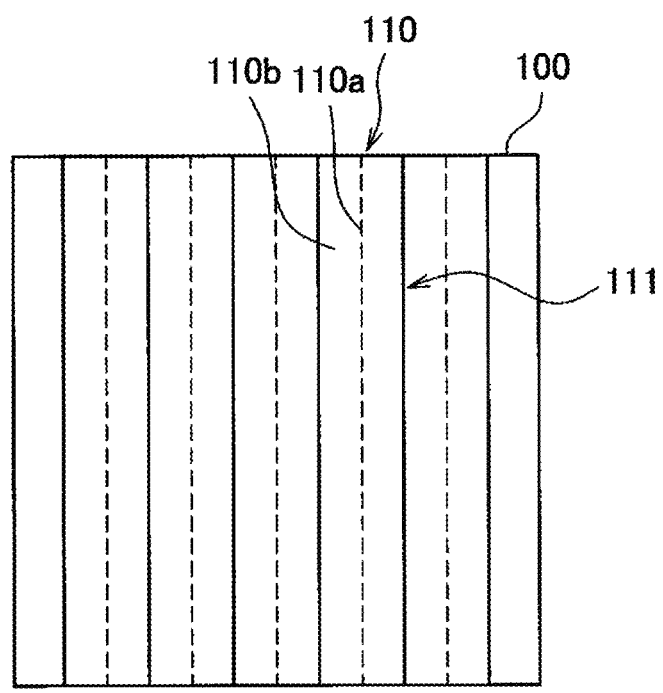
FIG. 6B is a plan view illustrating a specific example of fine concave portions.
Figure 6C:
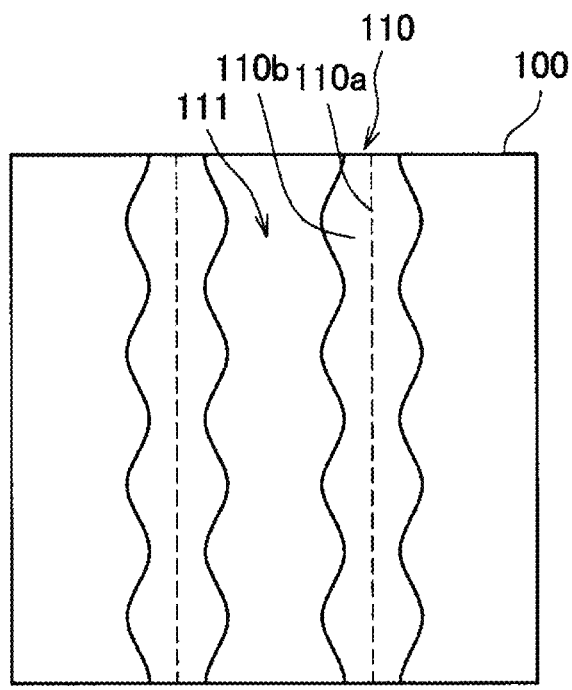
FIG. 6C is a plan view illustrating a specific example of fine concave portions.

Specific examples of the process will be described below, with reference to FIGS. 6A to 8B. FIGS. 6A and 6B illustrate an example of the round slice cutting pattern. In this example, the controller 72 performs cutting along the foregoing round slice cutting pattern. The controller 72 also oscillates the cutting tool 60 in the $z_2$-axis direction so as to satisfy the foregoing cutting condition (1) and/or (2). Here, cutting for one round of the master substrate 100 is one set of the cutting process. Further, the controller 72 overlaps the cutting regions by the cutting tool 60 between the pitches of the fine concave portions 110. As a result, the fine concave portions 110 illustrated in FIGS. 6A and 6B are formed. The bottom 110*a* and the sidewall 110*b* of the fine concave portion 110 and the fine convex portion 111 are linear in a plan view. Meanwhile, the height of the upper end of the fine convex portion 111 oscillates in the $z_2$-axis direction. Moreover, the oscillation waveforms of adjacent fine convex portions 111 are in phase with each other. In the case where the cutting regions by the cutting tool 60 are separated between the pitches of the fine concave portions 110, the fine concave portions 110 illustrated in FIG. 6C are formed. In this example, the bottom 110*a* of the fine concave portion 110 is linear in a plan view, whereas the shape of the sidewall 110b of the fine concave portion 110 is an oscillation waveform in a plan view. The oscillation waveforms of the sidewalls 110b of adjacent fine concave portions 110 are in phase with each other. Such an oscillation waveform is formed because the tool cutter 62 of the cutting tool 60 has a taper shape.

Figure 7A:
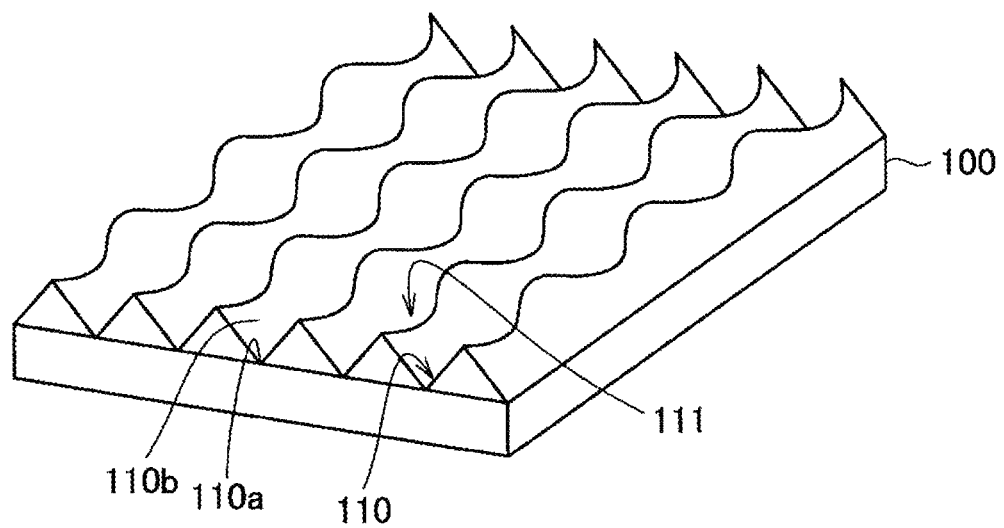
FIG. 7A is a perspective view illustrating a specific example of fine concave portions.
Figure 7B:
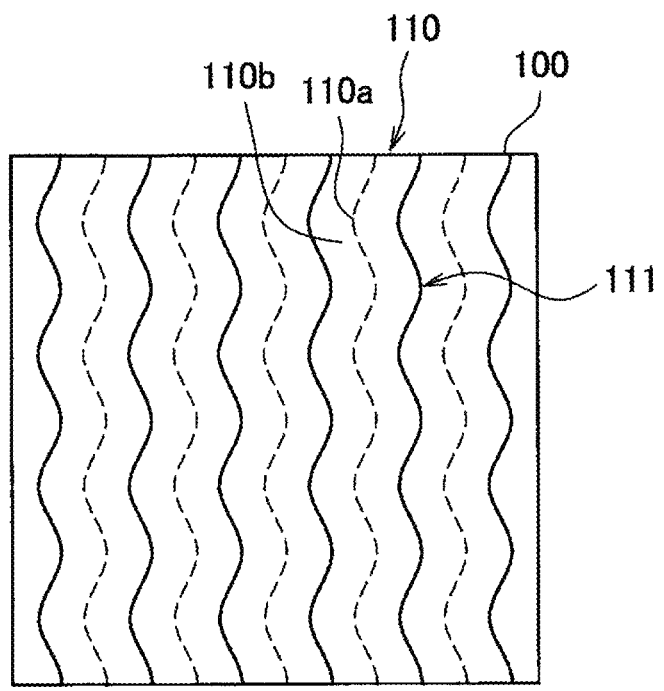
FIG. 7B is a plan view illustrating a specific example of fine concave portions.

FIGS. 7A and 7B illustrate an example of the round slice cutting pattern. In this example, the controller 72 performs cutting along the foregoing round slice cutting pattern. The controller 72 also oscillates the cutting tool 60 in the $x_2$-axis direction so as to satisfy the foregoing cutting condition (1) and/or (2). Here, cutting for one round of the master substrate 100 is one set of the cutting process. As a result, the fine concave portions 110 illustrated in FIGS. 7A and 7B are formed. The bottom 110a and the sidewall 110b of the fine concave portion 110 and the fine convex portion 111 are shaped as an oscillation waveform in a plan view. The oscillation waveforms of adjacent fine concave portions 110 are in phase with each other.

Figure 8A:
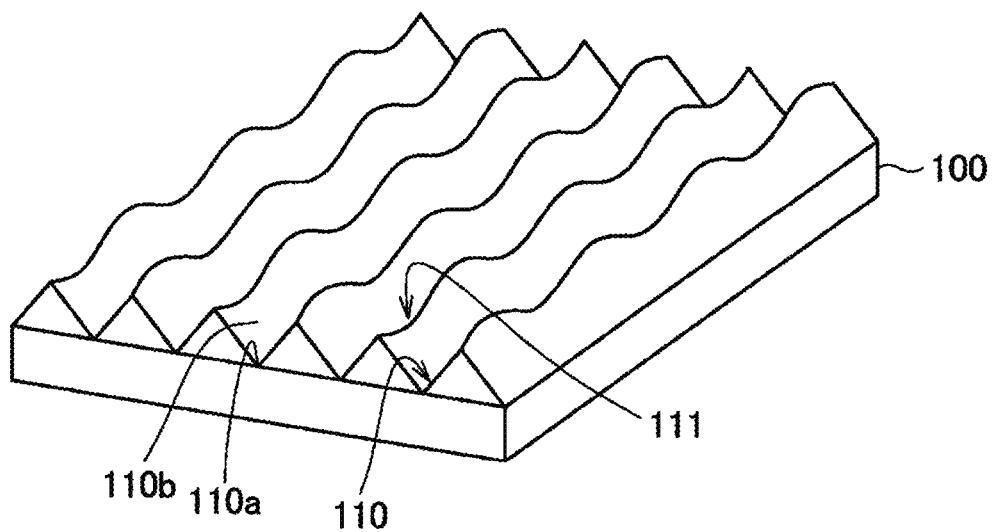
FIG. 8A is a perspective view illustrating a specific example of fine concave portions.
Figure 8B:
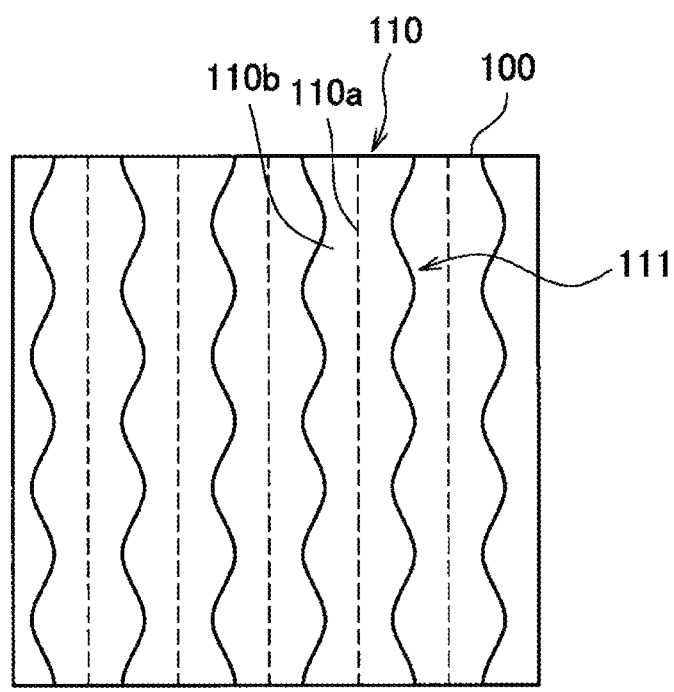
FIG. 8B is a plan view illustrating a specific example of fine concave portions.
Figure 20:
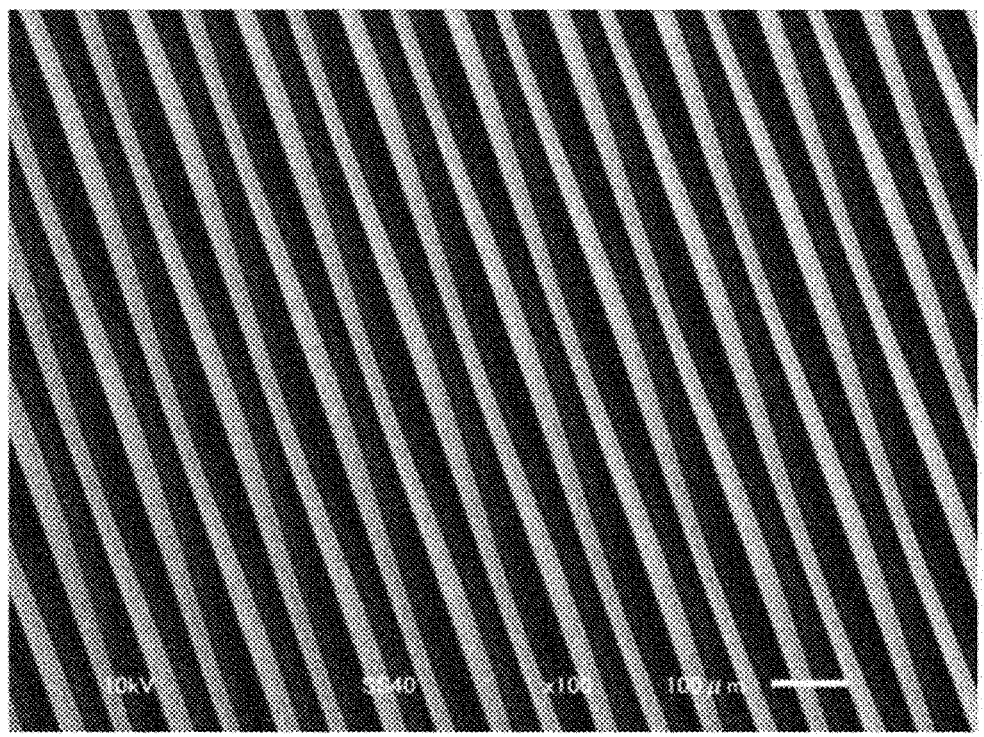
FIG. 20 is an SEM image of fine concave portions according to Example.

FIGS. 8A and 8B illustrate an example of the round slice cutting pattern. In this example, the controller 72 performs cutting along the foregoing round slice cutting pattern. The controller 72 also oscillates the cutting tool 60 in the $z_2$-axis direction so as to satisfy the foregoing cutting condition (1) and/or (2). Here, cutting for two rounds of the master substrate 100 is one set of the cutting process. Further, the controller 72 makes the cutting regions by the cutting tool 60 adjacent to each other between the pitches of the fine concave portions 110. As a result, the fine concave portions 110 illustrated in FIGS. 8A and 8B are formed. The bottom 110a of the fine concave portion 110 is linear in a plan view, and the sidewall 110b of the fine concave portion 110 and the fine convex portion 111 are shaped as an oscillation waveform in a plan view. Meanwhile, the height of the upper end of the fine convex portion 111 oscillates in the $z_2$-axis direction. Moreover, the oscillation waveforms of fine convex portions 111 are in phase with each other for every two pitches (i.e. every two rounds). The oscillation waveforms of adjacent fine convex portions 111 are 180° out of phase with each other. Such an oscillation waveform is formed because the tool cutter 62 of the cutting tool 60 has a taper shape. The same cutting may be performed for the helical cutting pattern. In this case, too, cutting for two rounds of the master substrate 100 is set as one set of the cutting process. FIG. 20 illustrates the surface shape of the master 120 produced (SEM photograph). As illustrated in FIG. 20, no defect is observed.

While the above describes specific examples of the process by the controller 72, the process by the controller 72 is not limited to these examples. In each of the specific examples, the controller 72 may perform the deep cutting process so as to satisfy the cutting condition (1) and/or (2). The controller 72 may perform cutting so as to satisfy the cutting condition (1) and/or (2) in the helical cutting pattern, the thrust cutting pattern, or the oblique thrust cutting pattern.

<4. Errors>

It is very important in this embodiment that the phase of the oscillation of the cutting tool is the same among the sets or at the start point and the end point of the same set, as indicated by the cutting conditions (1) and (2). In actual cutting, however, it is difficult to have the exactly same oscillation phase. We accordingly conducted study on acceptable errors, and found out that the defect is suppressed if an error is within a certain acceptable range.

For example, in the round slice cutting pattern, an error of the cutting condition (1) can occur. Specifically, an error that the y coordinate value of the start point and the y coordinate value of the end point overlap in any set (i.e. they coordinate value of the end point is more forward on the y-axis than the y coordinate value of the start point) can occur (case 1). Moreover, an error that the end point of cutting does not reach the start point of cutting in any set (i.e. the y coordinate value of the end point is more backward on the y-axis than the y coordinate value of the start point) can occur (case 2). In case 1, no defect occurs if the deviation (difference in level) of the cutting depth associated with the overlap is less than 0.5 µm. In case 2, no defect occurs if the length of a flat part between the start point and the end point in the y-axis direction is less than 0.5 µm. The range in which the depth of the difference in level or the length of the flat part is less than 0.5 µm is therefore the acceptable error range. If these errors are within the acceptable error range, the cutting condition (1) can be satisfied.

In the helical cutting pattern, the round slice cutting pattern, the thrust cutting pattern, and the oblique thrust cutting pattern, an error that the oscillation waveforms of adjacent fine concave portions 60 are out of phase with each other can occur, as an error of the cutting condition (2). No defect occurs if this error is less than 5°. The range in which the phase difference is less than 5° is therefore the acceptable error range. In the deep cutting process, an error that the oscillations of sets are out of phase with each other can occur, as an error of the cutting condition (2). No defect occurs if this error is less than 5°. The range in which the phase difference is less than 5° is therefore the acceptable error range. If these errors are within the acceptable error range, the cutting condition (2) can be satisfied.

<5. Microfabrication Method Using Microfabrication Device>

Figure 9A:
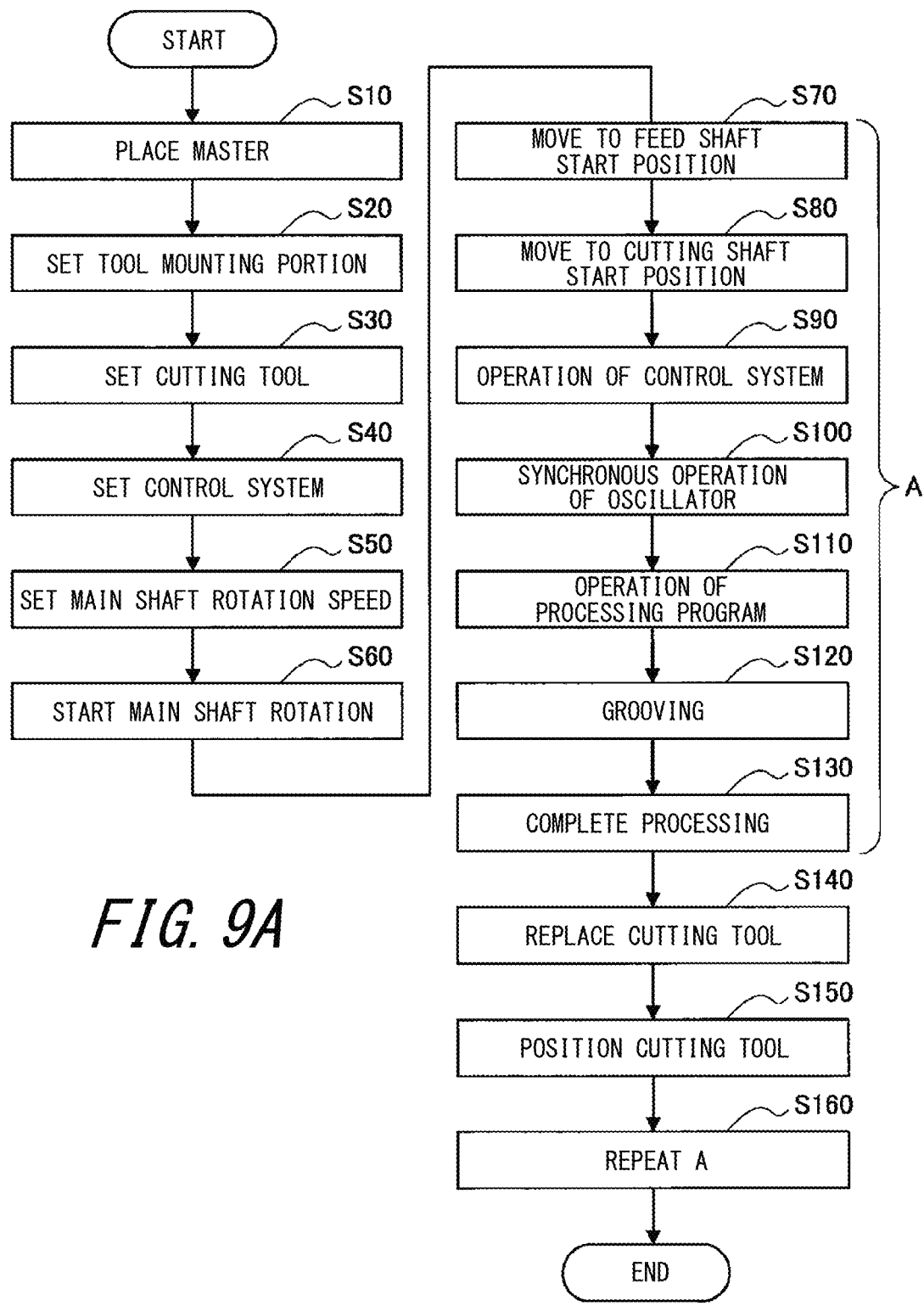
FIG. 9A is a flowchart of an example of a microfabrication method.

An example of a microfabrication method using the microfabrication device 1 will be described below, with reference to a flowchart in FIG. 9A. An operator produces a master through the following process.

In step S10, the operator prepares the master substrate 100. The shape of the master substrate 100 is not limited. For example, the shape of the master substrate 100 is columnar or cylindrical. The material of the master substrate 100 is not limited, but is preferably an amorphous material or a material with a small particle size in order to maintain the smoothness of the processing surface. For example, the master substrate 100 is preferably made of copper, a copper alloy, nickel, a nickel alloy, austenitic stainless steel, or duralumin. Specific examples include S45C and SUS304.

A coating layer may be formed on the surface of the master substrate 100. In this case, the fine concave portions 110 are formed on the coating layer. The method of forming the coating layer on the surface of the master substrate 100 is not limited, and may be, for example, the following method. First, the operator coats the circumferential surface of the master substrate 100 with the material (e.g. Cu, Ni—P alloy) of the coating layer. The type of the coating is not limited, and may be, for example, electroplating. The coating layer immediately after the formation often has a rough surface. Accordingly, after forming the coating layer on the circumferential surface of the master substrate 100, the coating layer may be subjected to smoothing treatment. The smoothing treatment is not limited. For example, a smoothing bit (a bit with a cutter of a curved surface shape) may be used. With this method, for example, the operator attaches the master substrate 100 with the coating layer formed thereon and the smoothing bit to a precision lathe. The operator then rotates the master substrate 100 about the central axis of the master substrate 100 as the rotation axis.

The operator then presses the cutter of the smoothing bit against one end of the coating layer in the axis direction. The axis direction herein denotes the central axis direction of the master substrate 100. After this, while rotating the master substrate 100, the operator moves the smoothing bit from the one end in the axis direction to the other end in the axis direction. The coating layer is smoothed as a result of this process.

The operator then mounts the master substrate 100 on the main rotation device 10.

In step S20, the operator sets the tool mounting portion 40 on the processing stage 30. The operator also provides the oscillator 50 in the tool mounting portion 40. Alternatively, the tool mounting portion 40 provided with the oscillator 50 beforehand may be prepared. In step S30, the operator stores the cutting tool 60 in the tool storage case 51.

In step S40, the operator sets the control system. In step S50, the operator sets the rotation speed of the main rotation device 10. Specifically, the operator inputs information necessary for obtaining a desired fine concave-convex pattern, to the control device 70. Examples of such information include the rotation speed of the master substrate 100, the movement locus and movement speed of the tool mounting portion 40, and the cutting depth, oscillation direction, oscillation waveform, oscillation frequency, and oscillation amplitude of the cutting tool 60. For example, the controller 72 displays an input screen on a display. The operator inputs the foregoing information using an input operation device. In the case where control that satisfies the cutting condition (1) and/or (2) cannot be performed with the provided information, the controller 72 may prompt the operator to correct the information. The controller 72 may display an example of a numeric value necessary to satisfy the cutting condition (1) and/or (2), on the input screen. The controller 72 outputs information about the rotation speed of the master substrate 100 to the main rotation device 10.

In step S60, the main rotation device 10 starts the rotation of the master substrate 100. The main rotation device 10 then outputs rotation information about the rotation angle of the master substrate 100 to the control device 70.

In steps S70 and S80, the controller 72 drives the processing stage 30 to change the position of the tool mounting portion 40 in each of the $x_1$-axis direction and the $z_1$-axis direction from the start position. That is, the tool mounting portion 40 is set at a position facing the master substrate 100.

In step S90, the operator starts the operation of the control system (i.e. the microfabrication device 1). In step S100, the control device 70 starts the synchronous operation of the oscillator 50. In detail, the control calculator 71 calculates the $x_2z_2$ coordinate value of the cutting tool 60, triggered by the rotation information provided from the main rotation device 10. Here, the control calculator 71 calculates the $x_2z_2$ coordinate value of the cutting tool 60 so that the oscillation of the cutting tool 60 satisfies at least one of the cutting conditions (1) and (2). The control calculator 71 outputs coordinate information about the calculated coordinate value to the controller 72. The controller 72 generates oscillation control information for moving the cutting tool 60 to the coordinate value calculated by the control calculator 71, and outputs the oscillation control information to the amplifier 73. The amplifier 73 amplifies the oscillation control information, and outputs the amplified oscillation control information to the oscillator 50. The tool oscillation elements 52a and 53a in the oscillator 50 operate based on the oscillation control information. Thus, the cutting tool 60 oscillates synchronously with the rotation of the master substrate 100.

In step S110, the control calculator 71 calculates the $x_1z_1$ coordinate value of the tool mounting portion 40 based on the rotation information provided from the main rotation device 10. Here, the control calculator 71 calculates the $x_1z_1$ coordinate value of the tool mounting portion 40 so as to satisfy at least one of the cutting conditions (1) and (2). The control calculator 71 outputs coordinate information about the calculated coordinate value to the controller 72. The controller 72 moves the tool mounting portion 40 according to the coordinate information, the processing program, and the information input by the operator. Thus, grooving is performed in step S120. That is, the fine concave portions 110 are formed on the surface of the master substrate 100. In detail, the controller 72 performs a plurality of sets of the cutting process of cutting the master substrate 100 while moving the tool mounting portion 40 relative to the master substrate 100 and oscillating the cutting tool 60. The controller 72 performs the cutting process so as to satisfy at least one of the cutting conditions (1) and (2). In the case where the value of the coordinate information provided from, for example, the displacement measuring instrument 52b or 53b differs from the instruction, the controller 72 may perform an abnormality process (such as stopping the operation and notifying the operator).

In step S130, the cutting (processing) of the master substrate 100 is completed. That is, cutting from one end to the other end of the master substrate 100 is completed. In the case of performing the deep cutting process, the following processes of steps S140 to S160 are further performed. In step S140, the operator replaces the cutting tool 60 according to need. In step S150, the operator positions the cutting tool 60. Specifically, the cutting tool 60 is positioned so that the cutting depth is deeper than that in the deep cutting process of the previous set. Subsequently, the operator repeatedly performs the processes of steps S70 to S130. This process then ends.

Figure 9B:
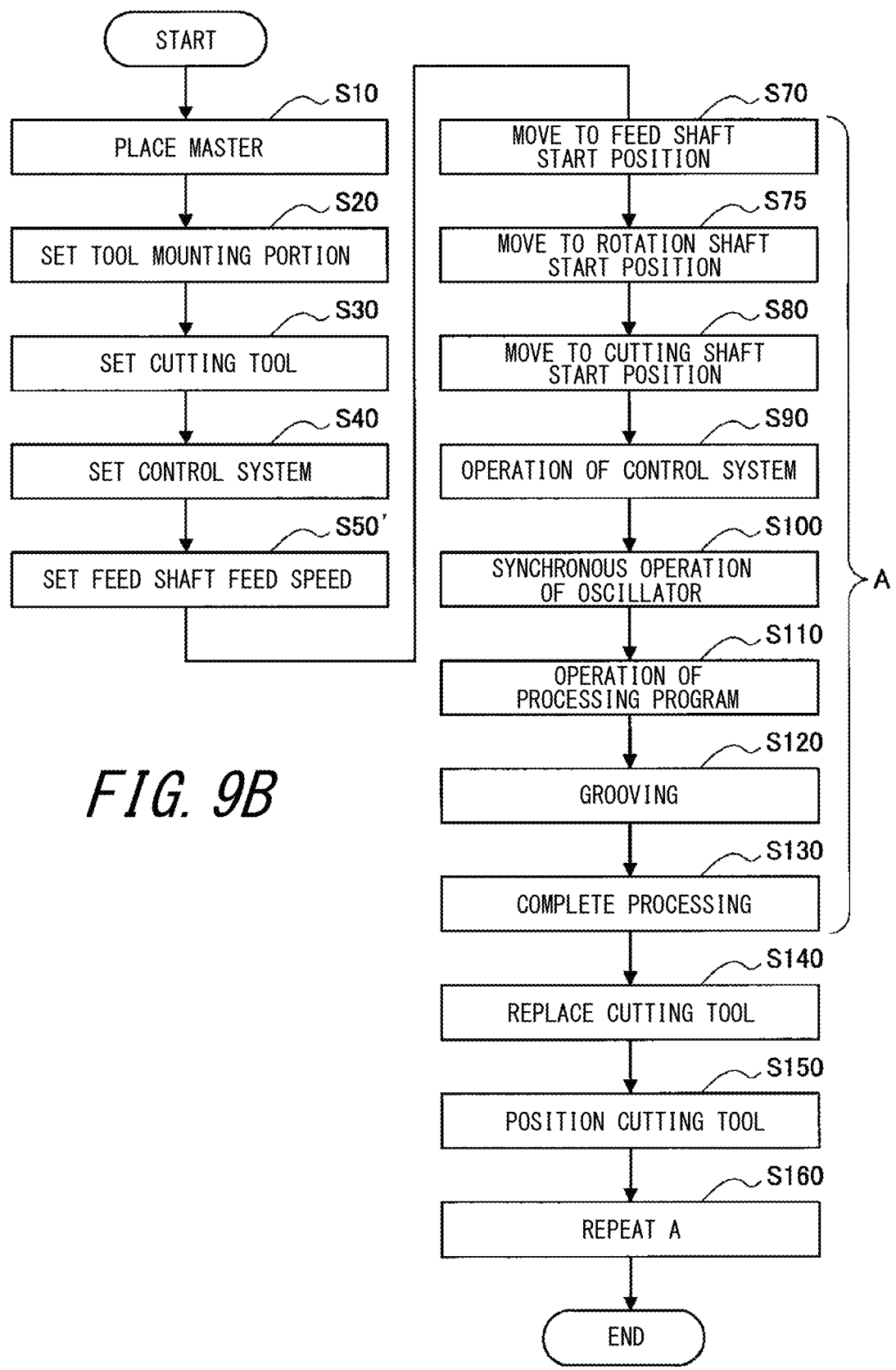
FIG. 9B is a flowchart of an example of a microfabrication method.

Another example of the microfabrication method using the microfabrication device 1 will be described below, with reference to a flowchart in FIG. 9B. The operator produces a master through the following process.

Steps S10 to S30 are the same as those described above.

In step S40, the operator sets the control system. In step S50', the operator sets feed speed of the feed shaft 31. Specifically, the operator inputs information necessary for obtaining a desired fine concave-convex pattern, to the control device 70. Examples of such information include the feed speed of the feed shaft 31, the movement locus of the tool mounting portion 40, and the cutting depth, oscillation direction, oscillation waveform, oscillation frequency, and oscillation amplitude of the cutting tool 60. For example, the controller 72 displays an input screen on a display. The operator inputs the foregoing information using an input operation device. In the case where control that satisfies the cutting condition (1) and/or (2) cannot be performed with the provided information, the controller 72 may prompt the operator to correct the information. The controller 72 may display an example of a numeric value necessary to satisfy the cutting condition (1) and/or (2), on the input screen. The controller 72 outputs information about the feed speed of the feed shaft 31 to the feed shaft 31.

In steps S70, S75, and S80, the controller 72 drives the processing stage to change the position of the tool mounting portion 40 in each of the $x_1$-axis direction and the $z_1$-axis direction from the start position. That is, the tool mounting portion 40 is set at a position facing the master substrate 100.

The controller 72 also moves the rotation axis of the master substrate 100 to the start position (i.e. the start rotation angle).

In step S90, the operator starts the operation of the control system (i.e. the microfabrication device 1). In step S100, the control device 70 starts the synchronous operation of the oscillator 50. In detail, the control calculator 71 calculates the $x_2z_2$ coordinate value of the cutting tool 60, triggered by the coordinate information ($x_1$ coordinate value) of the feed shaft 31. Here, the control calculator 71 calculates the $x_2z_2$ coordinate value of the cutting tool 60 so that the oscillation of the cutting tool 60 satisfies at least one of the cutting conditions (1) and (2). The control calculator 71 outputs coordinate information about the calculated coordinate value to the controller 72. The controller 72 generates oscillation control information for moving the cutting tool 60 to the coordinate value calculated by the control calculator 71, and outputs the oscillation control information to the amplifier 73. The amplifier 73 amplifies the oscillation control information, and outputs the amplified oscillation control information to the oscillator 50. The tool oscillation elements 52a and 53a in the oscillator 50 operate based on the oscillation control information. Thus, the cutting tool 60 oscillates synchronously with the coordinate of the feed shaft 31.

In step S110, the control calculator 71 calculates the $z_1$ coordinate value of the tool mounting portion 40 based on the position information provided from the main feed shaft 31. Here, the control calculator 71 calculates the $z_1$ coordinate value of the tool mounting portion 40 so as to satisfy at least one of the cutting conditions (1) and (2). The control calculator 71 outputs coordinate information about the calculated coordinate value to the controller 72. The controller 72 moves the tool mounting portion 40 according to the coordinate information, the processing program, and the information input by the operator. Thus, grooving is performed in step S120. That is, the fine concave portions 110 are formed on the surface of the master substrate 100. In detail, the controller 72 performs a plurality of sets of the cutting process of cutting the master substrate 100 while moving the tool mounting portion 40 relative to the master substrate 100 and oscillating the cutting tool 60. The controller 72 performs the cutting process so as to satisfy at least one of the cutting conditions (1) and (2). In the case where the value of the coordinate information provided from, for example, the displacement measuring instrument 52b or 53b differs from the instruction, the controller 72 may perform an abnormality process (such as stopping the operation and notifying the operator).

In step S130, the cutting (processing) of the master substrate 100 is completed. That is, cutting from one end to the other end of the master substrate 100 is completed. In the case of performing the deep cutting process, the processes of steps S140 to S160 are further performed. Steps S140 to S160 are the same as those described above. This process then ends.

The cutting distance by the cutting tool 60 is not limited. For example, the cutting distance may be 100 km or less, and may be 20 km or less. Cutting can be continued until the tool cutter 62 is damaged.

The depth of the fine concave portion 110 is not limited. For example, the depth of the fine concave portion 110 may be 1 μm to 200 μm, and is preferably 3 μm to 30 μm. The distance between the fine concave portions 110 (i.e. the pitch of the fine concave portion 110) is not limited. For example, the pitch of the fine concave portion 110 may be 5 μm to 500 μm, and is preferably 10 μm to 100 μm.

<6. Structure of Master>

FIGS. 10A, 10B, and 10C each illustrate an example of the master 120 produced by the above-described microfabrication method. The master 120 is, for example, a transfer mold used in imprint technology. The master 120 has a columnar or cylindrical shape, and many fine concave portions 110 are formed on its circumferential surface. At least one of the sidewall 110b and the bottom 110a of the fine concave portion 110 has an oscillation waveform that satisfies at least one of the following oscillation waveform conditions (1) to (4) (preferably all of the oscillation waveform conditions (1) to (4)).

Oscillation waveform condition (1): the oscillation waveform is continuous.

Oscillation waveform condition (2): the oscillation waveform is a composite waveform of a plurality of oscillation waveforms, and the plurality of oscillation waveforms are in phase with each other.

Oscillation waveform condition (3): fine concave portions 110 of a plurality of rows are formed on the master substrate 100, and the oscillation waveforms of adjacent fine concave portions 110 are in phase with each other.

Oscillation waveform condition (4): fine concave portions 110 of a plurality of rows are formed on the master substrate 100, and the oscillation waveforms of fine concave portions 110 are in phase with each other for every two pitches (i.e. every two rounds).

The oscillation waveform condition (1) corresponds to the foregoing cutting condition (1). The oscillation waveform condition (1) can be satisfied if the error in cutting of the cutting condition (1) is within the acceptable error range. The oscillation waveform condition (2) corresponds to the deep cutting process satisfying the cutting condition (2). The oscillation waveform conditions (3) and (4) correspond to the round slice cutting pattern or the helical cutting pattern satisfying the cutting condition (2). The expression "in phase with each other" in the oscillation waveform conditions (2) to (4) denotes that the phase at the same y coordinate of the master 120 is the same, i.e. the error in cutting of the cutting condition (2) is within the acceptable error range. In the oscillation waveform condition (4), the oscillation waveforms of adjacent fine concave portions 110 are 180° out of phase with each other. FIGS. 6A to 8B each illustrate an example of the shape of the fine concave portions 110.

Since the oscillation waveform of the master 120 satisfies at least one of the oscillation waveform conditions (1) to (4), the continuity of the oscillation waveform is maintained without a defect.

<7. Structure of Transfer Object>

Figure 11A:
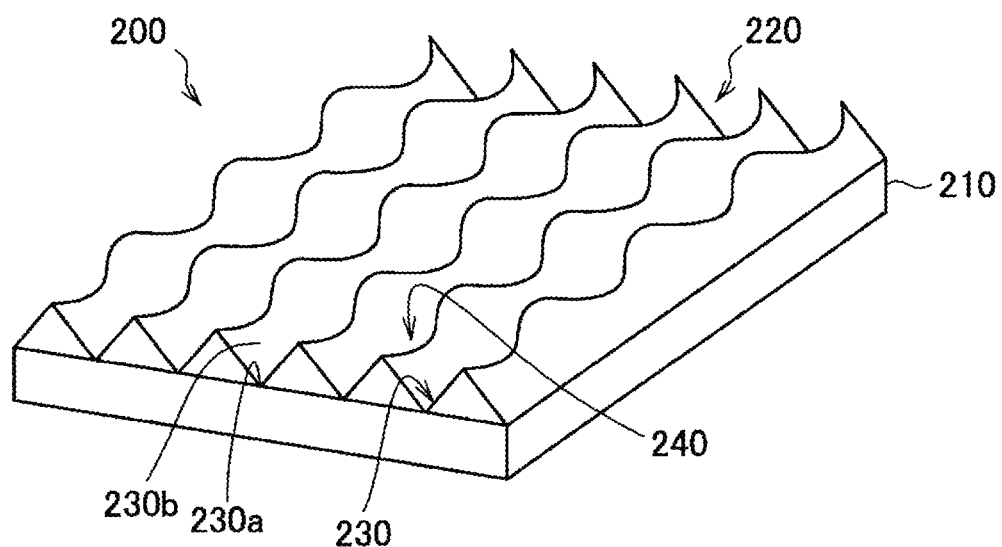
FIG. 11A is a perspective view illustrating an example of a transfer object.
Figure 11B:
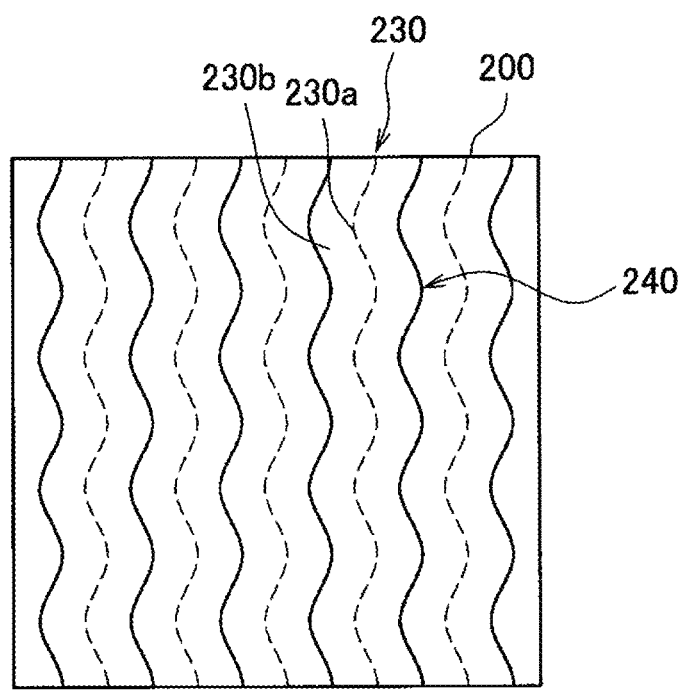
FIG. 11B is a plan view illustrating an example of a transfer object.

FIGS. 11A and 11B illustrate an example of the transfer object 200 produced by transferring the surface shape of the master 120. The transfer object 200 includes a transfer object substrate 210 and a fine concave-convex layer 220 formed on the surface of the transfer object substrate 210. The fine concave-convex layer 220 includes many fine concave portions 230 and fine convex portions 240 formed between the fine concave portions 230. The surface shape of the fine concave-convex layer 220 is an inversion of the surface shape of the master 120. That is, the shape of the fine concave portions 230 is an inversion of the shape of the fine convex portions 111, and the shape of the fine convex portions 240 is an inversion of the shape of the fine concave portions 110. The transfer object 200 illustrated in FIGS. 11A and 11B is produced using the master 120 illustrated in FIGS. 7A and 7B.

At least one of the sidewall 230b and the bottom 230a of the fine concave portion 230 has an oscillation waveform that satisfies at least one of the following oscillation waveform conditions (1) to (4) (preferably all of the oscillation waveform conditions (1) to (4)).

Oscillation waveform condition (1): the oscillation waveform is continuous.

Oscillation waveform condition (2): the oscillation waveform is a composite waveform of a plurality of oscillation waveforms, and the plurality of oscillation waveforms are in phase with each other.

Oscillation waveform condition (3): fine concave portions 230 of a plurality of rows are formed on the transfer object substrate 210, and the oscillation waveforms of adjacent fine concave portions 230 are in phase with each other.

Oscillation waveform condition (4): fine concave portions 230 of a plurality of rows are formed on the transfer object substrate 210, and the oscillation waveforms of fine concave portions 230 are in phase with each other for every two pitches.

The oscillation waveform conditions (1) to (4) correspond to the oscillation waveform conditions (1) to (4) of the master 120. The expression "in phase with each other" in the oscillation waveform conditions (2) to (4) of the transfer object 200 denotes that, in the case where the extending direction of the fine concave portions 230 is the y-axis, the phase at the same y coordinate is the same. In the oscillation waveform condition (4), the oscillation waveforms of adjacent fine concave portions 230 are 180° out of phase with each other.

Since the oscillation waveform of the transfer object 200 satisfies at least one of the oscillation waveform conditions (1) to (4), the continuity of the oscillation waveform is maintained without a defect.

<8. Manufacturing Method for Transfer Object>

The transfer object 200 is produced by transferring the fine concave portions 110 of the master 120. For example, an uncured curable resin layer is formed on the transfer object substrate 210. The material of the transfer object substrate 210 may be selected as appropriate depending on the use of the transfer object 200. Examples of the material of the transfer object substrate 210 include acrylic resin (polymethylmethacrylate, etc.), polycarbonate, PET (polyethylene terephthalate), TAC (triacetylcellulose), polyethylene, polypropylene, cycloolefin polymer, cycloolefin copolymer, and vinyl chloride.

The curable resin material may be selected as appropriate depending on the use of the transfer object 200. Examples of the curable resin material include epoxy curable resin and acrylic curable resin.

Next, the surface of the master 120 is pressed against the curable resin layer. The curable resin layer is cured in this state. In this way, the surface shape of the master 120 is transferred to the curable resin layer. That is, the fine concave-convex layer 220 is formed on the transfer object substrate 210. The master 120 is then peeled off from the fine concave-convex layer 220, to produce the transfer object 200. In this embodiment, the master 120 has a columnar or cylindrical shape, so that the transfer object 200 can be continuously produced by roll-to-roll process.

This is merely an example of the manufacturing method for the transfer object 200, and the transfer object 200 may be produced by other manufacturing methods. For example, the transfer object substrate 210 may be made of thermoplastic resin. In this case, the surface of the master 120 is pressed against the transfer object substrate 210 softened by heating. By cooling the transfer object substrate 210 in this state, the fine concave-convex layer 220 is formed on the surface of the transfer object substrate 210.

EXAMPLES

1. Example 1

Examples of this embodiment will be described below. In Example (Ex.) 1, the master substrate 100 of a columnar shape with a diameter of 250 mm and a length of 1000 mm was prepared. The material was S45C. The master substrate 100 was then subjected to nickel-phosphorus plating to form a coating layer on the master substrate 100. The coating layer was then flattened. The specific process for flattening is as described above.

Next, the microfabrication device 1 was prepared. As the cutting tool 60, a diamond bit whose tool tip 63 has a V shape was prepared. The number of rotations of the master substrate 100 was 20 $\text{min}^{-1}$. The oscillation waveform of the cutting tool 60 was a sine waveform with an amplitude of 10 µm and a frequency of 300 Hz. The oscillation direction was the $z_2$-axis direction. Cutting in the helical cutting pattern was performed so as to satisfy the foregoing cutting condition (1) and/or (2). The pitch of the fine concave portion 110 was 70 µm. Further, two sets of the deep cutting process satisfying the foregoing cutting condition (1) and/or (2) was performed. The difference between the cutting depth of the first set and the cutting depth of the second set (specifically, the difference between the maximum displacements of the oscillations), i.e. the cutting difference, was 3 µm.

The produced master 120 was then used to produce a transfer object. The surface shape of the transfer object was observed using a microscope of a magnification of 450 times and a scanning electron microscope (SEM) of a magnification of 100 times. As a result, the oscillation waveform was continuously formed in the fine concave portions 110, and no defect was found.

2. Example 2

The same test as in Example 1 was performed, except that the cutting pattern was the round slice cutting pattern. The pitch of the round slice cutting pattern was the same as in Example 1. As a result, the oscillation waveform was continuously formed in the fine concave portions 110, and no defect was found.

3. Example 3

The same test as in Example 1 was performed, except that the cutting pattern was the cross helical cutting pattern. The pitch of the cross helical cutting pattern was the same as in Example 1. As a result, the oscillation waveform was continuously formed in the fine concave portions 110, and no defect was found.

4. Comparative Example 1

Figure 12:
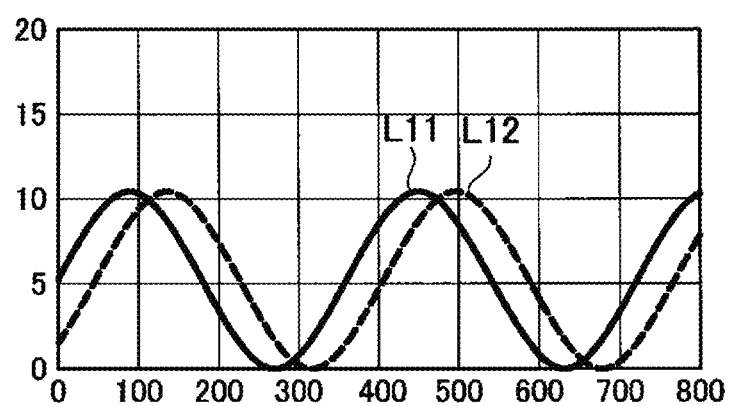
FIG. 12 is a graph illustrating an example of the oscillation waveform of the cutting tool.
Figure 13:
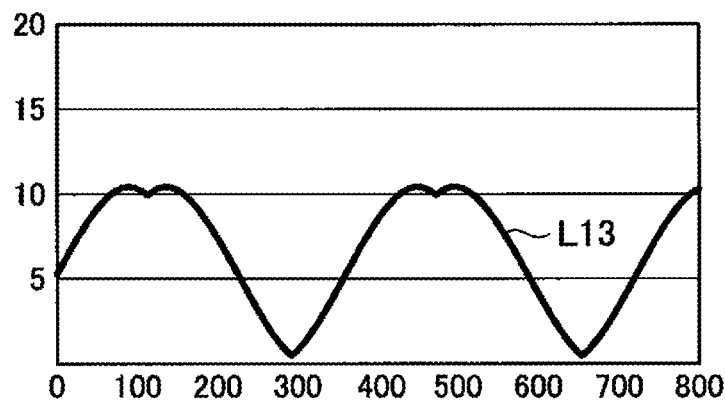
FIG. 13 is a graph illustrating an example of the oscillation waveform of the fine concave portions.

In Comparative Example (Comp. Ex.) 1, the same process as in Example 1 was performed, except that the deep cutting process of the first set and the deep cutting process of the second set were 45° out of phase with each other and the cutting difference was 0. That is, in Comparative Example 1, cutting not satisfying the cutting condition (2) was performed. FIG. 12 illustrates the oscillation waveform. In FIG. 12, the horizontal axis represents the oscillation phase (°), and the vertical axis represents the oscillation displacement ($z_2$ coordinate value+cutting difference). A graph L11 represents the oscillation waveform of the deep cutting process of the first set, and a graph L12 represents the oscillation waveform of the deep cutting process of the second set. The maximum difference (hereafter also referred to as "depth variation amount") D between the graphs L11 and L12 was about 25% of the depth set value (amplitude+cutting difference). A graph L13 in FIG. 13 represents the oscillation waveform of the fine concave portions 110. The horizontal axis represents the oscillation phase (°) of the fine concave portions 110, and the vertical axis represents the amplitude of the fine concave portions 110. In Examples 1 to 3, the graphs L11 and L12 are in phase with each other.

Figure 21:
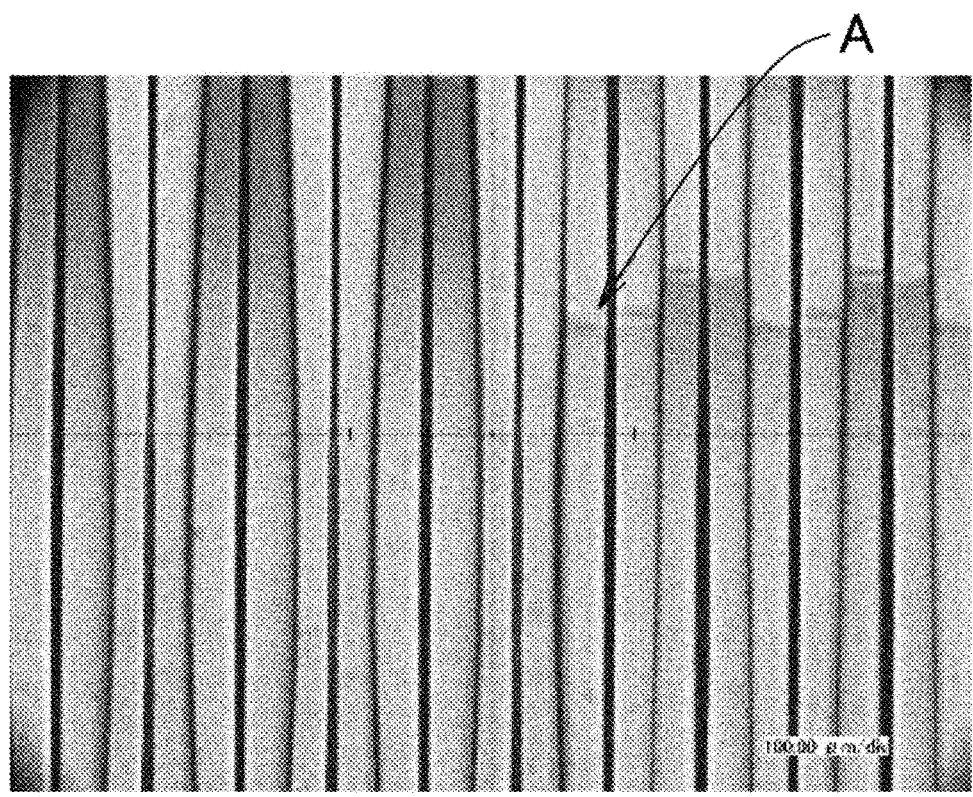
FIG. 21 is a microscope image of fine concave portions according to Comparative Example.

The surface shape of the transfer object produced in Comparative Example 1 was observed using a microscope of a magnification of 450 times and a scanning electron microscope (SEM) of a magnification of 100 times. As a result, a defect was found in the fine concave portions 110. FIG. 21 illustrates a microscope image as an example of an observed image. As can be seen from FIG. 21, a defect A was found in part of the fine concave portions 110.

5. Comparative Example 2

In Comparative Example 2, the same process as in Comparative Example 1 was performed, except that the phase difference between the deep cutting process of the first set and the deep cutting process of the second set was 90°. In Comparative Example 2, the depth variation amount D was 50% of the depth set value. The defect was found in Comparative Example 2, too.

6. Comparative Example 3

In Comparative Example 3, the same process as in Comparative Example 1 was performed, except that the phase difference between the deep cutting process of the first set and the deep cutting process of the second set was 180°. In Comparative Example 3, the depth variation amount D was 100% of the depth set value. The defect was found in Comparative Example 3, too.

7. Comparative Example 4

In Comparative Example 4, the same process as in Comparative Example 1 was performed, except that the phase difference between the deep cutting process of the first set and the deep cutting process of the second set was 10°. In Comparative Example 4, the depth variation amount D was 5% of the depth set value. The defect was found in Comparative Example 4, too.

8. Comparative Example 5

In Comparative Example 5, the same process as in Comparative Example 1 was performed, except that the phase difference between the deep cutting process of the first set and the deep cutting process of the second set was 5°. In Comparative Example 5, the depth variation amount D was 3% of the depth set value. The defect was found in Comparative Example 5, too.

9. Comparative Example 6

Figure 14:
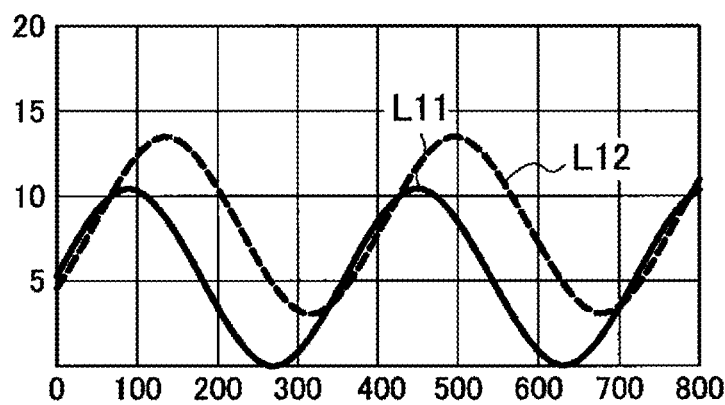
FIG. 14 is a graph illustrating an example of the oscillation waveform of the cutting tool.
Figure 15:
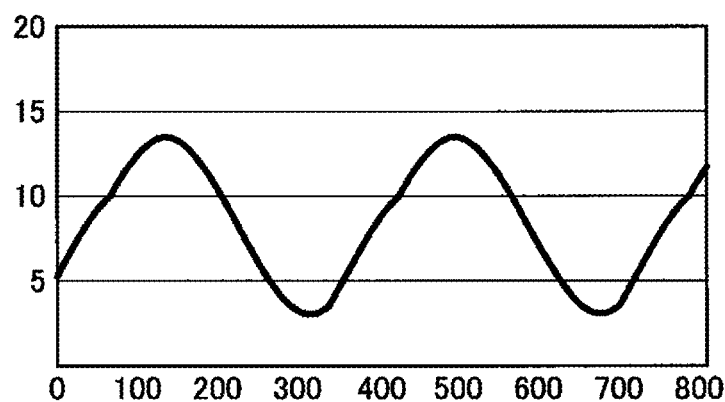
FIG. 15 is a graph illustrating an example of the oscillation waveform of the fine concave portions.

In Comparative Example 6, the same process as in Comparative Example 1 was performed, except that the cutting difference was 3 µm. FIG. 14 illustrates the oscillation waveform. In FIG. 14, the horizontal axis represents the oscillation phase (°), and the vertical axis represents the oscillation displacement ($z_2$ coordinate value+cutting difference). A graph L11 represents the oscillation waveform of the deep cutting process of the first set, and a graph L12 represents the oscillation waveform of the deep cutting process of the second set. The depth variation amount D was about 25% of the depth set value. A graph L13 in FIG. 15 represents the oscillation waveform of the fine concave portions 110. The horizontal axis represents the oscillation phase (°) of the fine concave portions 110, and the vertical axis represents the amplitude of the fine concave portions 110. The defect was found in Comparative Example 6, too.

10. Comparative Example 7

In Comparative Example 7, the same process as in Comparative Example 2 was performed, except that the cutting difference was 3 µm. The depth variation amount D was about 50% of the depth set value. The defect was found in Comparative Example 7, too.

11. Comparative Example 8

Figure 22:
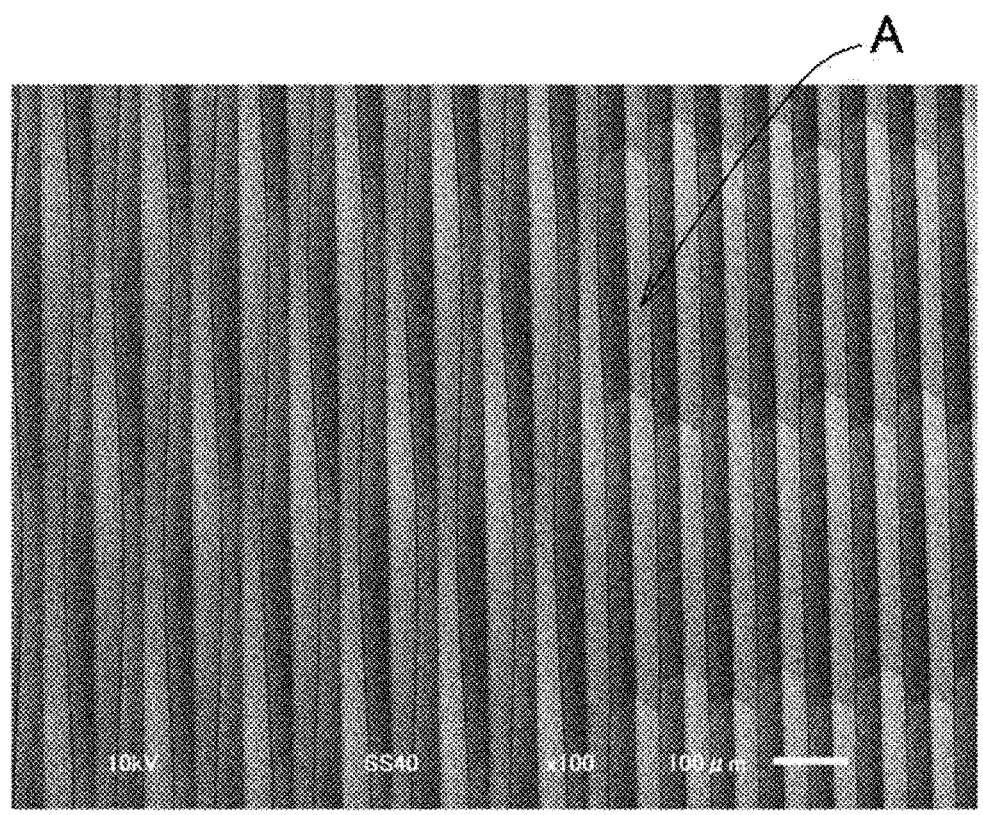
FIG. 22 is an SEM image of fine concave portions according to Comparative Example.

In Comparative Example 8, the same process as in Comparative Example 3 was performed, except that the cutting difference was 3 µm. The depth variation amount D was about 100% of the depth set value. The defect was found in Comparative Example 8, too. FIG. 22 illustrates an SEM image as an example of an observed image. As can be seen from the SEM image, the defect A was found in Comparative Example 8.

12. Comparative Example 9

In Comparative Example 9, the same process as in Example 1 was performed, except that the cutting difference was 3 µm and the phase difference was 40°. The depth variation amount D was about 22% of the depth set value. The defect was found in Comparative Example 9, too.

13. Comparative Example 10

In Comparative Example 10, the same process as in Example 1 was performed, except that the cutting difference was 3 µm and the phase difference was 50°. The depth variation amount D was about 27% of the depth set value. The defect was found in Comparative Example 10, too.

14. Comparative Example 11

Figure 16:
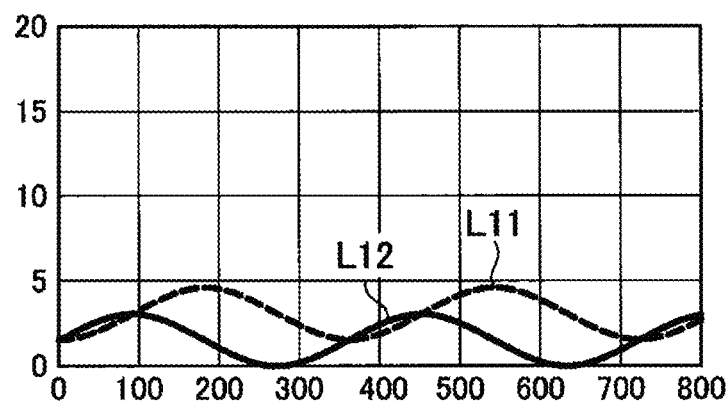
FIG. 16 is a graph illustrating an example of the oscillation waveform of the cutting tool.
Figure 17:
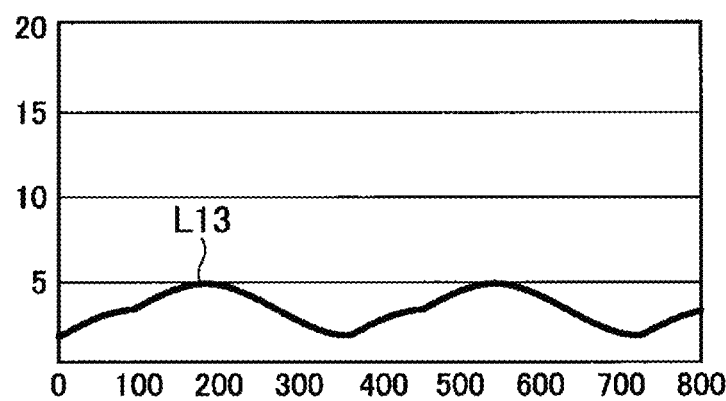
FIG. 17 is a graph illustrating an example of the oscillation waveform of the fine concave portions.

In Comparative Example 11, the same process as in Comparative Example 2 was performed, except that the amplitude was 3 µm and the cutting difference was 1.5 µm. FIG. 16 illustrates the oscillation waveform. In FIG. 16, the horizontal axis represents the oscillation phase (°), and the vertical axis represents the oscillation displacement ($z_2$ coordinate value+cutting difference). A graph L11 represents the oscillation waveform of the deep cutting process of the first set, and a graph L12 represents the oscillation waveform of the deep cutting process of the second set. The depth variation amount D was about 50% of the depth set value. A graph L13 in FIG. 17 represents the oscillation waveform of the fine concave portions 110. The horizontal axis represents the oscillation phase (°) of the fine concave portions 110, and the vertical axis represents the amplitude of the fine concave portions 110. The defect was found in Comparative Example 11, too.

15. Comparative Example 12

In Comparative Example 12, the same process as in Comparative Example 3 was performed, except that the amplitude was 3 μm and the cutting difference was 1.5 μm. The depth variation amount D was about 100% of the depth set value. The defect was found in Comparative Example 12, too.

16. Comparative Example 13

In Comparative Example 13, the same process as in Comparative Example 1 was performed, except that the cutting pattern was the round slice cutting pattern. The defect was found in Comparative Example 13, too.

17. Comparative Example 14

In Comparative Example 14, the same process as in Comparative Example 2 was performed, except that the cutting pattern was the round slice cutting pattern. The defect was found in Comparative Example 14, too.

18. Comparative Example 15

In Comparative Example 15, the same process as in Comparative Example 3 was performed, except that the cutting pattern was the round slice cutting pattern. The defect was found in Comparative Example 15, too.

19. Comparative Example 16

Figure 18:
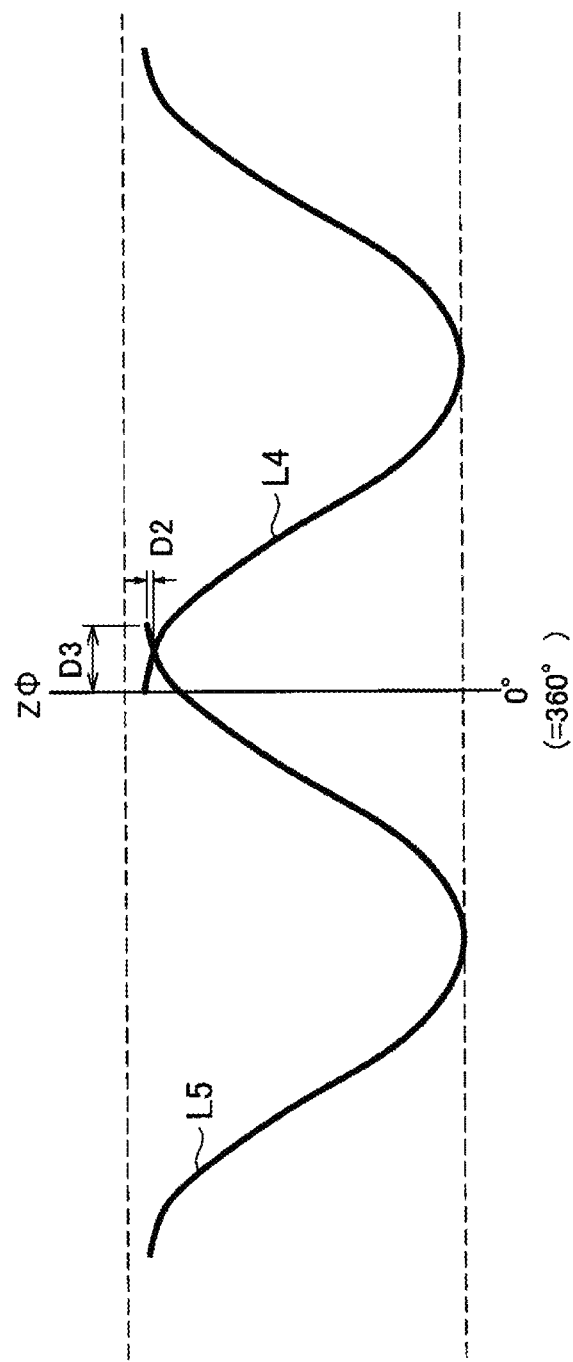
FIG. 18 is a graph illustrating an example of the oscillation waveform of the cutting tool.

In Comparative Example 16, the cutting pattern was the round slice cutting pattern. Further, cutting not satisfying the cutting condition (1) was performed, without the deep cutting process. Specifically, cutting was performed so that the length of the overlap was 110 μm and the difference in level was 0.6 μm in the foregoing case 1. FIG. 18 illustrates the oscillation waveform of the cutting. In FIG. 18, the horizontal axis represents the y coordinate value (°), and the vertical axis represents the oscillation displacement (μm). A graph L4 represents the oscillation waveform near the start point, and a graph L5 represents the oscillation waveform near the end point. A distance D2 represents the depth of the difference in level, and a distance D3 represents the length of the overlap. In Comparative Example 16, the defect was found at the boundary part between the start point and the end point.

20. Example 4

The same process as in Comparative Example 16 was performed, except that the length of the overlap was 6.2 μm and the difference in level was 0.003 μm. As a result, no defect was found.

21. Comparative Example 17

Figure 19:
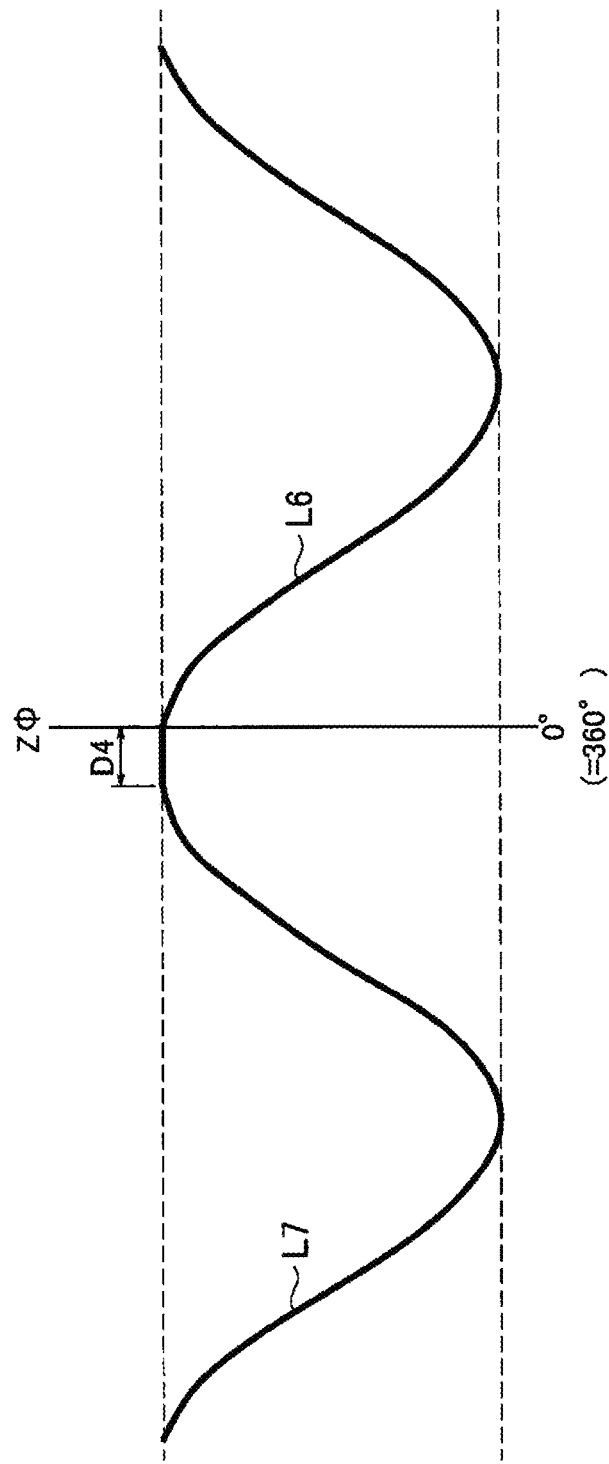
FIG. 19 is a graph illustrating an example of the oscillation waveform of the cutting tool.

In Comparative Example 17, the cutting pattern was the round slice cutting pattern. Further, cutting not satisfying the cutting condition (1) was performed, without the deep cutting process. Specifically, cutting was performed so that the length of the flat part was 0.55 μm in the foregoing case 2. FIG. 19 illustrates the oscillation waveform of the cutting. In FIG. 19, the horizontal axis represents the y coordinate value (°), and the vertical axis represents the oscillation displacement (μm). A graph L6 represents the oscillation waveform near the start point, and a graph L7 represents the oscillation waveform near the end point. A distance D4 represents the length of the flat part (the length in the y-axis direction). In Comparative Example 17, the defect was found at the boundary part between the start point and the end point.

22. Example 5

The same process as in Comparative Example 17 was performed, except that the length of the flat part was 0.2 μm. As a result, no defect was found.

23. Example 6

The same test as in Example 1 was performed, except that the cutting pattern was the thrust cutting pattern. In Example 6, the cutting tool 60 was oscillated synchronously with the coordinate of the feed shaft 31. The output $x_2z_2$ coordinate value of the cutting tool 60 was generated using an arbitrary waveform generator. Processing was started without rotating the master substrate 100, and, upon detecting the first trigger of the encoder of the feed shaft 31, an arbitrary waveform was generated to drive the tool mounting portion 40. As a result, the oscillation waveform was continuously formed in the fine concave portions 110, and no defect was found.

24. Example 7

The same test as in Example 6 was performed, except that the cutting pattern was the oblique thrust cutting pattern. In the oblique thrust cutting pattern in Example 7, the inclination angle of the fine concave portions 110 with respect to the axis direction of the master substrate 100 was 15°. As a result, the oscillation waveform was continuously formed in the fine concave portions 110, and no defect was found.

These results are listed in Tables 1 and 2.

TABLE 1

|  | Ex. 1 | Ex. 2 | Ex. 3 | Ex. 4 | Ex. 5 | Ex. 6 | Ex. 7 |
| --- | --- | --- | --- | --- | --- | --- | --- |
| Cutting pattern | Helical | Round slice | Cross helical | Round slice | Round slice | Thrust | Oblique thrust |
| Synchronous control | Performed | Performed | Performed | Performed | Performed | Performed | Performed |
| Cutting difference (μm) | 3 | 3 | 3 | — | — | 3 | 3 |
| Phase difference (°) | 0 | 0 | 0 | — | — | 0 | 0 |
| Length of difference in level or flat part (μm) | — | — | — | 0.003 | 0.2 | — | — |
| Defect | Not found | Not found | Not found | Not found | Not found | Not found | Not found |

TABLE 2

|  | Comp. Ex. 1 to 5 | Comp. Ex. 6 to 10 | Comp. Ex. 11 to 12 | Comp. Ex. 13 to 15 | Comp. Ex. 16 | Comp. Ex. 17 |
|---|---|---|---|---|---|---|
| Cutting pattern | Helical | Helical | Helical | Round slice | Round slice | Round slice |
| Synchronous control | Not performed | Not performed | Not performed | Not performed | Not performed | Not performed |
| Cutting difference (μm) | 0 | 3 | 1.5 | 0 | — | — |
| Phase difference (°) | 5 to 180 | 5 to 180 | 90 to 180 | 45 to 180 | — | — |
| Length of difference in level or flat part (μm) | — | — | — | — | 0.6 | 0.55 |
| Defect | Found | Found | Found | Found | Found | Found |

In Examples satisfying the cutting condition (1) and/or (2), no defect was found. In Comparative Examples 1 to 17 not satisfying the cutting conditions (1) and (2), the defect was found.

While disclosed embodiments have been described in detail above with reference to the attached drawings, the present disclosure is not limited to such embodiments. It is clear that, within the scope of the technical idea defined in the claims, various changes or modifications are conceivable by a person with ordinary skill in the technical field to which the presently disclosed techniques belong, and these changes or modifications are also included in the technical scope of the present disclosure. For example, although the oscillation waveform of the cutting tool 60 is a sine waveform in the foregoing embodiments, the oscillation waveform of the cutting tool 60 is not limited to such, and may be any oscillation waveform. The oscillation waveform may be a trapezoidal waveform or the like.

For example, although the master substrate 100 has a columnar or cylindrical shape in the foregoing embodiments, the master substrate 100 is not limited to such, and may have a platelike shape as an example. In this case, for example, the y-axis is the length direction of the fine concave portions. Although the cutting target is a master substrate in the foregoing embodiments, the presently disclosed techniques may be used for cutting of other substrates.

REFERENCE SIGNS LIST 1 microfabrication device
10 main rotation device
12 follower rotation device
20 cutting device
30 processing stage
31 feed shaft
40 tool mounting portion
41 case storage recess
50 oscillator
51 tool storage case
52a, 53a tool oscillation element
52b, 53b displacement measuring instrument
60 cutting tool
61 tool body
62 tool cutter
63 tool tip
70 control device
71 control calculator
72 controller
73 amplifier
100 master substrate
110 fine concave portion
110a bottom
110b sidewall
111 fine convex portion
120 master
200 transfer object
210 transfer object substrate
220 fine concave-convex layer
230 fine concave portion
230a bottom
230b sidewall
240 fine convex portion

The invention claimed is:

1. A microfabrication device comprising:
a tool mounting portion;
a cutting tool provided in the tool mounting portion, and configured to form fine concave portions on a substrate;
a driving portion configured to move the tool mounting portion relative to the substrate;
an oscillator provided in the tool mounting portion, and configured to oscillate the cutting tool in at least one of a depth direction and a surface direction of the substrate; and
a controller configured to perform a plurality of sets of a cutting process of cutting the substrate while moving the tool mounting portion relative to the substrate and oscillating the cutting tool,
wherein the controller is configured to perform the cutting process to satisfy both of:
a cutting condition (1) that oscillations at a start point and an end point of each set are in phase with each other; and
a cutting condition (2) that oscillations of the sets are in phase with each other, and
wherein the cutting process includes a deep cutting process of repeatedly cutting a same part, with a cutting depth of a current set being deeper than a cutting depth of a previous set.

2. The microfabrication device according to claim 1, wherein the cutting process includes a parallel cutting process of performing cutting of a current set at a position adjacent to a cutting position of a previous set.

3. The microfabrication device according to claim 2, wherein the substrate has a columnar or cylindrical shape,
the driving portion includes: a substrate driving portion configured to rotate the substrate about a central axis of the substrate as a rotation axis; and a tool movement portion configured to move the tool mounting portion in a direction parallel to the rotation axis, and the controller is configured to move the tool mounting portion relative to the substrate, by rotating the substrate and moving the tool mounting portion in the direction parallel to the rotation axis.

4. A microfabrication method using the microfabrication device according to claim 2, the microfabrication method comprising:
   providing the cutting tool in the tool mounting portion;
   setting the tool mounting portion at a position facing the substrate; and
   performing a plurality of sets of a cutting process of cutting the substrate while moving the tool mounting portion relative to the substrate and oscillating the cutting tool,
   wherein the cutting process is performed to satisfy both of:
   a cutting condition (1) that oscillations at a start point and an end point of each set are in phase with each other; and
   a cutting condition (2) that oscillations of the sets are in phase with each other, and
   wherein the cutting process includes a deep cutting process of repeatedly cutting a same part, with a cutting depth of a current set being deeper than a cutting depth of a previous set.

5. The microfabrication device according to claim 1, wherein the substrate has a columnar or cylindrical shape,
   the driving portion includes: a substrate driving portion configured to rotate the substrate about a central axis of the substrate as a rotation axis; and a tool movement portion configured to move the tool mounting portion in a direction parallel to the rotation axis, and
   the controller is configured to move the tool mounting portion relative to the substrate, by rotating the substrate and moving the tool mounting portion in the direction parallel to the rotation axis.

6. A microfabrication method using the microfabrication device according to claim 5, the microfabrication method comprising:
   providing the cutting tool in the tool mounting portion;
   setting the tool mounting portion at a position facing the substrate; and
   performing a plurality of sets of a cutting process of cutting the substrate while moving the tool mounting portion relative to the substrate and oscillating the cutting tool,
   wherein the cutting process is performed to satisfy both of:
   a cutting condition (1) that oscillations at a start point and an end point of each set are in phase with each other; and
   a cutting condition (2) that oscillations of the sets are in phase with each other, and
   wherein the cutting process includes a deep cutting process of repeatedly cutting a same part, with a cutting depth of a current set being deeper than a cutting depth of a previous set.

7. A microfabrication method using the microfabrication device according to claim 1, the microfabrication method comprising:
   providing the cutting tool in the tool mounting portion;
   setting the tool mounting portion at a position facing the substrate; and
   performing a plurality of sets of a cutting process of cutting the substrate while moving the tool mounting portion relative to the substrate and oscillating the cutting tool,
   wherein the cutting process is performed to satisfy both of:
   a cutting condition (1) that oscillations at a start point and an end point of each set are in phase with each other; and
   a cutting condition (2) that oscillations of the sets are in phase with each other, and
   wherein the cutting process includes a deep cutting process of repeatedly cutting a same part, with a cutting depth of a current set being deeper than a cutting depth of a previous set.

* * * * *